US012699441B1

(12) United States Patent
Fischer et al.

(10) Patent No.: US 12,699,441 B1
(45) Date of Patent: Aug. 4, 2026

(54) SURFACE-BASED USER INPUT FOR EXTENDED REALITY

(71) Applicant: Snap Inc., Santa Monica, CA (US)

(72) Inventors: Robert Fischer, Vienna (AT); Kai Zhou, Wiener Neudorf (AT)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 19/042,855

(22) Filed: Jan. 31, 2025

(51) Int. Cl.
| | |
|---|---|
| *G06F 3/01* | (2006.01) |
| *G06T 7/70* | (2017.01) |
| *G06V 40/10* | (2022.01) |

(52) U.S. Cl.
CPC ............... *G06F 3/011* (2013.01); *G06T 7/70* (2017.01); *G06V 40/11* (2022.01); *G06T 2207/30196* (2013.01)

(58) Field of Classification Search
CPC ...... G06F 3/011; G06F 3/017; G06F 3/04815; G06T 7/70; G06T 2207/30196; G06V 40/11
See application file for complete search history.

(56) References Cited

U.S. PATENT DOCUMENTS

| | | | |
|---|---|---|---|
| 5,603,054 A | 2/1997 | Theimer et al. | |
| 6,539,441 B1 | 3/2003 | Dieckman et al. | |
| 9,374,377 B2 | 6/2016 | Clevy et al. | |
| 10,902,250 B2 | 1/2021 | Konin et al. | |
| 11,501,504 B2 | 11/2022 | Rohan | |
| 2012/0113223 A1 | 5/2012 | Hilliges et al. | |
| 2013/0016070 A1* | 1/2013 | Starner .................. | G06F 3/011 |
| | | | 345/175 |

| | | | |
|---|---|---|---|
| 2015/0178492 A1 | 6/2015 | Allen | |
| 2015/0269783 A1* | 9/2015 | Yun ....................... | G06F 3/0304 |
| | | | 345/633 |
| 2016/0004575 A1 | 1/2016 | Fink et al. | |

(Continued)

FOREIGN PATENT DOCUMENTS

| | | |
|---|---|---|
| WO | WO-2026054950 A1 | 3/2026 |
| WO | WO-2026059812 A1 | 3/2026 |
| WO | WO-2026059954 A1 | 3/2026 |

OTHER PUBLICATIONS

"U.S. Appl. No. 18/823,412, Non Final Office Action mailed May 21, 2025", 12 pgs.

(Continued)

*Primary Examiner* — Rodney Amadiz
(74) *Attorney, Agent, or Firm* — SCHWEGMAN LUNDBERG & WOESSNER, P.A.

(57) ABSTRACT

Systems and methods in the present disclosure relate to surface-based user input for extended reality (XR) devices. An XR device tracks a hand of a user across multiple captured image frames to obtain positions of the hand in a real-world environment. The XR device detects an input plane associated with a physical surface in the real-world environment and projects the positions onto the input plane. The XR device continuously monitors an input state with respect to the input plane to identify when the user is providing user input via the input plane and to differentiate between ongoing user input and finalized user input. Based on the monitoring of the input state, the XR device records one or more of the projected positions as input data. The input data is processed to interpret the user input. The XR device executes an action based on the interpreted user input.

20 Claims, 14 Drawing Sheets

(56)    References Cited

U.S. PATENT DOCUMENTS

| | | | |
|---|---|---|---|
| 2016/0224123 | A1 | 8/2016 | Antoniac et al. |
| 2016/0255167 | A1 | 9/2016 | Green et al. |
| 2017/0352196 | A1 | 12/2017 | Chen et al. |
| 2018/0121644 | A1 | 5/2018 | Baker |
| 2018/0332211 | A1 | 11/2018 | Chaudhri et al. |
| 2019/0265781 | A1 | 8/2019 | Kehoe et al. |
| 2020/0202121 | A1* | 6/2020 | Konin ................... G06V 40/107 |
| 2021/0089131 | A1* | 3/2021 | Wang ....................... G06F 3/013 |
| 2021/0191600 | A1 | 6/2021 | Lemay et al. |
| 2023/0031913 | A1 | 2/2023 | Ishikawa et al. |
| 2023/0100610 | A1 | 3/2023 | Pastrana Vicente et al. |
| 2023/0117197 | A1* | 4/2023 | Stolzenberg ....... G02B 27/0101 715/863 |
| 2023/0274492 | A1 | 8/2023 | Chen et al. |
| 2023/0281254 | A1 | 9/2023 | Kocienda et al. |
| 2024/0094866 | A1 | 3/2024 | Lemay et al. |
| 2024/0248576 | A1 | 7/2024 | Fong et al. |
| 2025/0298469 | A1* | 9/2025 | Chen ....................... G06F 3/011 |
| 2026/0064186 | A1 | 3/2026 | Hwang et al. |
| 2026/0072519 | A1 | 3/2026 | Hwang et al. |
| 2026/0079864 | A1 | 3/2026 | Zakrzewski |

OTHER PUBLICATIONS

"U.S. Appl. No. 18/823,412, Examiner Interview Summary mailed Jul. 28, 2025", 2 pgs.

"U.S. Appl. No. 18/823,412, Final Office Action mailed Dec. 1, 2025", 11 pgs.

"U.S. Appl. No. 18/823,412, Response filed Aug. 21, 2025 to Non Final Office Action mailed May 21, 2025", 9 pgs.

"U.S. Appl. No. 18/885,807, Non Final Office Action mailed Dec. 4, 2025", 21 pgs.

"International Application Serial No. PCT/US2025/042009, International Search Report mailed Oct. 29, 2025", 5 pgs.

"International Application Serial No. PCT/US2025/042009, Written Opinion mailed Oct. 29, 2025", 7 pgs.

"International Application Serial No. PCT/US2025/045020, International Search Report mailed Nov. 27, 2025", 4 pgs.

"International Application Serial No. PCT/US2025/045020, Written Opinion mailed Nov. 27, 2025", 5 pgs.

"International Application Serial No. PCT/US2025/045669, International Search Report mailed Dec. 19, 2025", 3 pgs.

"International Application Serial No. PCT/US2025/045669, Written Opinion mailed Dec. 19, 2025", 6 pgs.

"U.S. Appl. No. 18/823,412, Corrected Notice of Allowability mailed May 14, 2026", 2 pgs.

"U.S. Appl. No. 18/823,412, Notice of Allowance mailed Apr. 16, 2026", 11 pgs.

"U.S. Appl. No. 18/823,412, Response filed Mar. 2, 2026 to Final Office Action mailed Dec. 1, 2025", 8 pgs.

"U.S. Appl. No. 18/885,807, Final Office Action mailed Apr. 21, 2026", 18 pgs.

"U.S. Appl. No. 18/885,807, Response filed Feb. 2, 2026 to Non Final Office Action mailed Dec. 4, 2025", 12 pgs.

"International Application Serial No. PCT/US2026/012817, International Search Report mailed Apr. 10, 2026", 5 pgs.

"International Application Serial No. PCT/US2026/012817, Written Opinion mailed Apr. 10, 2026", 8 pgs.

* cited by examiner

226

SURFACE-BASED INPUT SYSTEM

302 — INPUT PLANE DETECTION AND TRACKING COMPONENT

304 — POSITION TRANSFORMING COMPONENT

306 — INPUT STATE MONITORING COMPONENT

308 — INPUT PROCESSING AND RECOGNITION COMPONENT

502

504

506

502

SURFACE-BASED USER INPUT FOR EXTENDED REALITY

TECHNICAL FIELD

The subject matter disclosed herein generally relates to extended reality (XR) technology. Particularly, but not exclusively, the subject matter relates to user input techniques for XR devices and to systems and methods for detecting and interpreting user input in an XR context.

BACKGROUND

Various XR devices can combine digital and physical environments, for example, through head-mounted displays and sensor arrays that process real-time data about a user's surroundings. XR devices face inherent technical challenges in accurately tracking and interpreting three-dimensional movements, gestures, or environmental features while maintaining low latency and high precision. Detecting and correctly interpreting user input in XR environments often requires complex computer vision algorithms, sensor fusion, and various other data processing operations. For example, an XR device may perform spatial mapping processes and implement algorithms for dynamic object detection and tracking (e.g., hand tracking) to understand both a user's position in the real world and their interactions with the XR device or other real-world objects.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
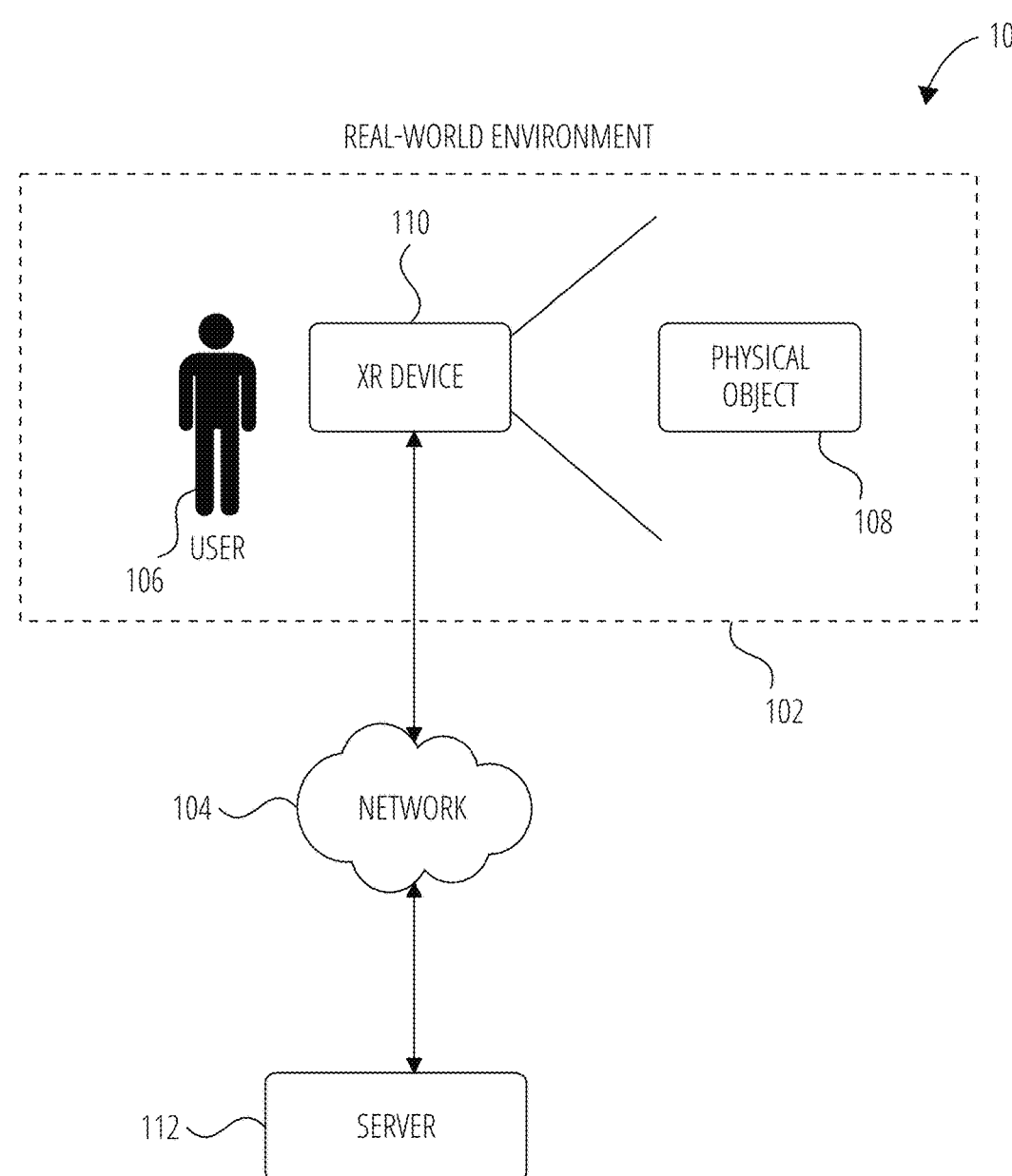
FIG. 1 diagrammatically illustrates a network environment for operating an XR device, according to some examples.

In the realm of XR, users encounter challenges in interacting with digital content or providing user input to an XR device in a manner that feels intuitive and seamless. Traditional interfaces for providing input in XR technologies can significantly detract from the immersive experience. This is particularly problematic in settings where precision and ease of interaction are useful, such as in professional and creative environments, or where privacy is a potential concern. For example, voice input is inefficient compared to other means of user input and is not suitable in various scenarios (e.g., when working in a public space or where precise commands are needed), while conventional hand gesture detection lacks physical haptic feedback and provides a relatively sparse input signal (e.g., limited to binary or simple gestures, such as tapping, pinching, or pointing).

Existing methodologies may thus fail to provide a seamless and natural interaction paradigm useful for conveying sufficiently complex information, leading to reduced efficiency in task execution and user frustration. Moreover, the lack of intuitive or useful input mechanisms can hinder the broader adoption and utility of XR technologies across various fields, limiting their potential impact and benefits.

The methodologies described herein address these technical challenges by enabling intuitive and efficient user interactions that leverage surfaces in the user's environment. The described methodologies may not only improve overall user satisfaction but also broaden the potential applications of XR systems. Approaches described herein can facilitate a more engaging user experience and also pave the way for the adoption of XR technologies in various industry sectors, promoting wider acceptance and utilization of such technologies.

In some examples, one or more planes that are present in, or based on features present in, a real-world scene are used to facilitate complex user input. A plane can be arbitrary in the sense that it is detected in real time, during a user session, instead of being predetermined.

An XR device may track a plane and project, in real-time, one or more parts of the hand of the user (e.g., a fingertip) onto the plane, simulating a virtual drawing board to provide input or commands. In this way, the XR device allows for quick, easy, and haptic user input, without constraints present in existing technologies and while still utilizing a common user input tool for XR environments (e.g., a hand or finger). Input provided via such an input plane can also be significantly richer or more complex than simple hand gesture-based inputs, such as conventional tapping, pinching, or pointing gestures. Moreover, examples described herein enable the user to provide input in a privacy-conscious manner since the input plane itself, while associated with a physical surface, is virtual, and the input provided (e.g., written or drawn on a surface) is not visible to other persons present in the real-world scene.

The term "augmented reality" (AR), as used herein, may include an interactive experience of a real-world environment where physical objects or environments that reside in the real world are "augmented," modified, or enhanced by computer-generated digital content (also referred to as virtual content, synthetic content, or digital effects). AR may also refer to a system that enables a combination of real and virtual worlds, real-time interaction, and three-dimensional (3D) registration of virtual and real objects. In some examples, a user of an AR system can perceive virtual content that appears to be attached or interact with a real-world physical object. The term "AR application" is used herein to refer to a computer-operated application that enables an AR experience.

The term "virtual reality" (VR), as used herein, may include a simulation experience of a virtual world environment that is distinct from the real-world environment. Computer-generated digital content may thus be displayed in the virtual world environment. VR may refer to a system that enables a user of a VR system to be completely immersed in the virtual world environment and to interact with virtual objects presented in the virtual world environment.

XR devices may include AR devices and/or VR devices. While examples described in the present disclosure focus primarily on XR devices that provide an AR experience (e.g., virtual content overlaid onto the real world), it will be appreciated that at least some aspects of the present disclosure may also be applied in a VR context.

Examples in the present disclosure can be implemented on an XR device (e.g., AR glasses or another type of head-mounted device) composed of one or multiple outward cameras to observe the real-world environment. The XR device may provide real-time hand pose tracking in three dimensions. Furthermore, the XR device may be configured to estimate a 3D model (e.g., mesh) of the surrounding environment using, for example, Simultaneous Localization and Mapping (SLAM) technology. The XR device may include one or more additional sensors, such as an accelerometer capable of reporting gravity direction. These features together with processing components of the XR device enable the XR device to maintain consistent tracking of both an input plane and a user's input-providing element (e.g., the hand).

A method for facilitating the provision of user input in an XR context can include tracking, by an XR device, a hand of a user across multiple image frames to obtain positions of one or more parts (e.g., at least one fingertip) of the hand in a real-world environment. The XR device may detect an input plane that is associated with a physical surface in the real-world environment.

An "input plane," as used herein, may include a plane, zone, or region associated with a physical surface in a real-world environment that can serve as an interaction surface for user input in an XR system. The input plane may be detected through various means, including plane fitting algorithms applied to hand tracking data, image-based plane detection, or 3D scene reconstruction. In some examples, the input plane can include or be associated with (e.g., fitted to) a user's palm, a table surface, a counter, a top surface of a bench, a feature on a wall, or other environmental surfaces that can be tracked by the XR device's sensors. In some examples, the input plane provides a reference surface onto which 3D hand movements and/or finger positions can be projected to enable interpretation of user input. For instance, when using a palmar surface as an input plane, the device may fit the plane between wrist and finger joint landmarks to establish a writing surface that can move with the user's hand (e.g., by fitting a plane to the wrist joint and one or multiple knuckle joints, such as the index finger knuckle joint and/or middle finger knuckle joint). As another example, the system may fit the plane using at least two knuckle joints and at least two fingertips based on their respective landmark positions as tracked by the XR device.

In some examples, an input plane functions as (or as part of) a graphical user interface. For example, as the user writes a letter on a real-world surface, the XR device detects the letter and displays it to the user in the form of virtual content presented so as to appear overlaid onto the surface. In other examples, the input plane and/or input provided thereon is not displayed to the user, while the input plane is still tracked and used to gather user input.

The method may include projecting tracked hand positions onto the detected input plane. During operation, the XR device may monitor an input state with respect to the input plane to identify when the user is providing user input via the input plane and to differentiate between ongoing user input and finalized user input.

An "input state," as used herein, may include information about one or both of the current engagement status between a user's hand and an input plane, and the progression status of a user interaction sequence. The input state may be monitored using multiple approaches, such as image-based cues from a machine learning model (e.g., a neural network), geometry-based cues such as hand shape, general heuristics such as distance to plane, temporal context (e.g., movement patterns), or combinations thereof. In some examples, the input state distinguishes between touching and non-touching conditions, or engaging and non-engaging conditions, to determine when actual input is being provided, while also tracking whether an interaction sequence is ongoing or has been finalized. For instance, when a user writes a number "7" with two distinct strokes (e.g., with the hand being lifted up between strokes), the input state maintains awareness that both strokes are part of the same character input despite the finger being lifted between strokes. The input state may consider factors beyond simple distance thresholds, incorporating, for example, machine learning to determine when a user is actively providing input versus merely positioning or otherwise moving their hand.

In some implementations, the recording of projected positions may involve recording multiple projected positions while the input state indicates ongoing user input, with these positions being recorded as user input for a single user interaction. The XR device may detect transitions in the input state that indicate when user input is finalized, and in response, consolidate the multiple recorded positions for unified interpretation.

A "single user interaction," as used herein, may include an input sequence, set, pattern, or other full interaction performed by a user on an input plane. A single user interaction may include one or more individual strokes or movements. For example, a single user interaction may extend beyond a single tap or a single swipe in one direction. In some examples, the single user interaction begins when the XR device detects commencement of user input and continues until the XR device detects ending of the user input. In some examples, a single user interaction may include multiple projected positions that are recorded while the input state indicates ongoing user input, such as when writing a character that requires multiple strokes. Moreover, a single user interaction may include variations of an interaction. For example, some users may write the number "7" with two strokes, as mentioned above, as well as an additional horizontal line below the common upper horizontal line, with the XR device maintaining awareness that such an additional horizontal line can optionally be added and, if so, forms part of the same interaction.

The monitoring of the input state can include detecting commencement of a single user interaction at a first point in time, updating the input state to indicate ongoing input, detecting the ending of the interaction at a second point in time, and updating the state to indicate finalized input. This monitoring process can involve processing at least some of the captured image frames to detect engagement between parts of the hand and the input plane.

In some examples, based on this monitoring of the input state, the XR device records one or more of the projected positions as input data, processes this input data to interpret the user input, and executes actions based on the interpreted input. In certain examples, the tracked parts of the hand include a fingertip, which the XR device tracks across the multiple frames. The user may provide input by using one or more fingers to write or draw on the physical surface, with the system detecting what has been written or drawn through optical character recognition (OCR), image classification, or other algorithms or models (e.g., spatial or spatio-temporal models). For example, OCR can be used by the XR device to recognize digits, letters, words, or sentences, while other input items, such as signatures, unlock patterns, or complex gestures, can be detected using image classification models.

It is noted that, in the context of the present disclosure, when a user "writes," "draws," or "gestures," or otherwise provides input via the input plane, they may physically move their finger or other user input element across a real-world surface such as the surface of their palm or a table, but actual marks may not necessarily appear on the physical surface. Instead, the XR device tracks these movements and projects them onto the detected input plane in a virtual manner, allowing the XR device to capture and process the input. In some examples, the user receives natural haptic feedback from touching the physical surface while the interpreted input may be displayed as virtual content through a display arrangement. For example, in the context of the present disclosure, when a user "writes" a number on their palm, they feel the physical contact with their palmar surface, but the actual visual representation of the number appears as virtual content visible through the XR device rather than as physical marks on their hand.

The hand tracking functionality of the XR device may generate 3D position data, which the XR device converts to two-dimensional (2D) position data in an input plane space when projecting positions onto the input plane. The XR device may generate a 3D reconstruction of the real-world environment that can be analyzed to detect potential input planes. For instance, this detection process may involve identifying multiple potential input planes using a scene mesh, calculating associated projection errors for each potential input plane relative to the scene mesh, and selecting the input plane that minimizes these errors.

The tracking functionality of the XR device may specifically track at least one fingertip of the hand that the user employs to provide input. As the user provides input, the input plane may move relative to the XR device, with the XR device performing continuous tracking of both the plane position relative to the XR device and the hand position relative to the XR device. In some examples, for each captured image frame, the XR device updates both the plane position and hand position, using these updated positions to generate projected positions for points in time associated with each particular frame.

The XR device may perform additional processing steps prior to interpreting the user input, such as interpolation to smooth the input data. In some examples, the technique includes tracking the plurality of landmark positions across the multiple image frames, applying temporal smoothing to at least a subset of the plurality of landmark positions and/or to the fitted input plane itself, and dynamically updating the input plane based on the temporal smoothing. In some examples, the input plane is dynamically updated in this manner to stabilize its tracked position for a relevant point in time (e.g., frame) prior to projecting the relevant position or positions of the hand onto the input plane for that point in time.

Another pre-processing step may involve updating the input data by performing rotation normalization. "Rotation normalization," as used herein, may include processes for adjusting input data to account for different orientations of the input plane relative to the user or XR device. The rotation normalization may be performed by the XR device prior to interpreting user input (e.g., prior to determining the action to trigger for the relevant input) and can utilize various approaches including gravity direction from device sensors, heuristic methods based on natural writing orientation, or rotation-invariant recognition algorithms. In some examples, rotation normalization enables the XR device to correctly interpret similar symbols that could have different meanings based on orientation, such as distinguishing between the number "8" and an infinity symbol. The normalization process may consider both the spatial relationship between the input plane and XR device as well as the user's natural writing orientation.

In some examples, XR devices enable colocated users (e.g., users who are physically present in the same room, hall, or park) to have a shared XR experience. This may include a synchronized multi-user session where two or more XR devices establish communication links to enable their users to interact with virtual content at the same time. The shared XR experience may include coordinated tracking and presentation of virtual content across multiple XR devices (e.g., multiple colocated XR devices), with each XR device typically executing a corresponding application that manages virtual content generation and facilitates alignment and synchronization with other participating XR devices.

These shared experiences or environments can be useful for various types of activities, such as gaming, education, entertainment, or design. Examples in the present disclosure can be implemented during a shared XR experience. For example, a table surface in the real world, that is visible to both a first user wearing a first XR device and a second user wearing a second XR device, can be detected as an input plane. Both users may then write or draw on the table surface to provide input, for example, to interact with the other user or to control aspects of the shared XR experience.

Examples in the present disclose provide one or more technical solutions to technical problems. One example of a technical problem is the lack of haptic feedback in certain conventional XR input mechanisms. In examples of the present disclosure, this issue is addressed by linking an input plane with a physical surface in the real world. This provides the physical haptic feedback of touching real surfaces while allowing the system to interpret the input in an accurate manner (and, in some cases, to display the input virtually).

Another example of a technical problem is the difficulty of detecting and distinguishing between intentional movements or engagements made in an attempt to provide user input and unintentional or irrelevant movements in an XR context. The technical challenge may involve precisely determining when a finger or other input element is actually touching a surface versus hovering near it or moving past it, especially given the variations in hand sizes and tracking accuracy limitations. This is further complicated by the need to maintain accurate detection while both the user's hand and XR device may be moving. One solution to these technical challenges described herein implements input state monitoring to track hand positions across multiple image frames and differentiates between ongoing and finalized user input.

A further example of a technical problem is the challenge of correctly interpreting user input by an XR device, particularly when such input is provided relative to a surface or object that is arbitrarily oriented in space. Examples in the present disclosure enable an XR device to detect or recognize, and subsequently interpret, user input by maintaining accurate projection mapping for various viewing angles, plane orientations, or user movements. For example, when the user is writing on their own palm to provide input, the XR device implements continuous real-time adjustment of projection calculations to account for changes in the orientation of the input plane. In some examples, positions are dynamically updated for each image frame to maintain accuracy during movement.

In some examples, the input plane located on or near a physical surface (e.g., a palmar surface or real-world table surface) provides tactile physical feedback, enhancing user interaction through tactile responses. This tactile interaction may offer a more satisfying experience compared to mid-air gestures, because it involves direct physical contact by the user. Such contact is not only more intuitive but also reinforces the user's actions by providing immediate physical sensations. In some examples, the sensation of writing on, drawing on, gesturing against, or otherwise interacting using a physical surface can obviate the need for visual cues, which is advantageous in XR environments. In these XR environments, users often have to split their visual attention between virtual and real-world elements. The tactile feedback aids in reducing cognitive load and enhancing the overall interaction efficiency, ensuring that users can operate the system confidently even without constant visual confirmation.

Examples in the present disclosure apply various sophisticated computing techniques, such as real-time processing of multiple image frames and sensor data streams simultaneously, complex 3D spatial calculations for projecting hand positions onto detected planes, neural network-based touch detection that processes multiple input parameters, continuous tracking and updating of both plane and hand positions relative to the XR device, or integration of multiple sensor inputs including image sensors, depth sensors, and/or inertial sensors to maintain accurate tracking and projection. Improvements described in the present disclosure can result in an improved user experience and accurate user input detection while maintaining computational efficiency.

FIG. 1 is a network diagram illustrating a network environment 100 suitable for operating an XR device 110, according to some examples. The network environment 100 includes an XR device 110 and a server 112, communicatively coupled to each other via a network 104. The XR device 110 and the server 112 may each be implemented in a computer system, in whole or in part, as described below with respect to FIG. 20. The server 112 may be part of a network-based system. For example, the network-based system may be or include a cloud-based server system that provides additional information, such as virtual content (e.g., 3D models of virtual objects, or digital effects to be applied, for example, as virtual overlays onto images depicting real-world scenes) to the XR device 110.

A user 106 operates the XR device 110. In some examples, the user 106 can be a human user (e.g., a human being), a machine user (e.g., a computer configured by a software program to interact with the XR device 110), or a combination thereof (e.g., a human assisted by a machine or a machine supervised by a human).

The user 106 is not part of the network environment 100, but is associated with the XR device 110. For example, where the XR device 110 is a head-wearable apparatus (e.g., AR glasses or an AR headset), the user 106 wears the XR device 110 during a user session.

The XR device 110 may have different display arrangements. In some examples, the display arrangement may include a screen that displays what is captured with a camera of the XR device 110. In some examples, the display of the device may be transparent or semi-transparent. In other examples, the display may be non-transparent and wearable by the user to cover the field of vision of the user.

In some examples the user 106 operates an application of the XR device 110, referred to herein as an AR application. The AR application may be configured to provide the user 106 with an experience triggered or enhanced by a physical object 108, such as a 2D physical object (e.g., a picture), a 3D physical object (e.g., a statue, a hand of the user, or the hand of another person), a location (e.g., a factory or shop), or any references (e.g., perceived corners of walls or furniture, or Quick Response (QR) codes) in the real-world physical environment. For example, the user 106 may point a camera of the XR device 110 to capture an image of the physical object 108 and a virtual overlay may be presented over the physical object 108 via the display. Experiences may be triggered or enhanced by a hand or other body part of the user 106 or of another person, e.g., the XR device 110 may detect and respond to hand gestures. In examples in the present disclosure, the user 106 is enabled to use their hand to provide various types of input to the XR device 110 via an input plane, e.g., by writing or drawing on a real-world surface associated with the input plane.

The XR device 110 includes tracking components (not shown in FIG. 1). The tracking components track the pose (e.g., position and/or orientation) of the XR device 110 relative to the real-world environment 102 using image sensors (e.g., depth-enabled 3D camera, and image camera), inertial sensors (e.g., gyroscope, accelerometer, or the like), wireless sensors (e.g., Bluetooth™ or Wi-Fi™), a Global Positioning System (GPS) sensor, and/or audio sensor to determine the location of the XR device 110 within the real-world environment 102.

In some examples, the server 112 may be used to detect and identify the physical object 108 based on sensor data (e.g., image and depth data) from the XR device 110, and determine a pose of the XR device 110 and the physical object 108 based on the sensor data. The server 112 can also generate a virtual object based on the pose of the XR device 110 and the physical object 108.

In some examples, the server 112 communicates a virtual object to the XR device 110. The XR device 110 or the server 112, or both, can also perform image processing, object detection and object tracking functions based on images captured by the XR device 110 and one or more parameters internal or external to the XR device 110. The object recognition, tracking, and AR rendering can be performed on either the XR device 110, the server 112, or a combination between the XR device 110 and the server 112. Accordingly, while certain functions are described herein as being performed by either an XR device or a server, the location of certain functionality may be a design choice. For example, a particular technology and functionality may be deployed within a server system initially, but later to migrate this technology and functionality to a client installed locally at the XR device where the XR device has sufficient processing capacity.

The network 104 may be any network that enables communication between or among machines (e.g., server 112), databases, and devices (e.g., XR device 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

The server 112 and/or XR device 110 can also implement a compliance system to facilitate compliance with data privacy and other regulations, including for example the California Consumer Privacy Act (CCPA), General Data Protection Regulation (GDPR), and Digital Services Act (DSA). The compliance system comprises several components that address data privacy, protection, and user rights, ensuring a secure environment for user data. A data collection and storage component securely handles user data, using encryption and enforcing data retention policies. A data access and processing component provides controlled access to user data, ensuring compliant data processing and maintaining an audit trail. A data subject rights management component facilitates user rights requests in accordance with privacy regulations, while the data breach detection and response component detects and responds to data breaches in a timely and compliant manner. The compliance system also incorporates opt-in/opt-out management and privacy controls across the digital interaction system, empowering users to manage their data preferences. The compliance system is designed to handle sensitive data by obtaining explicit consent, implementing strict access controls and in accordance with applicable laws.

Figure 2:
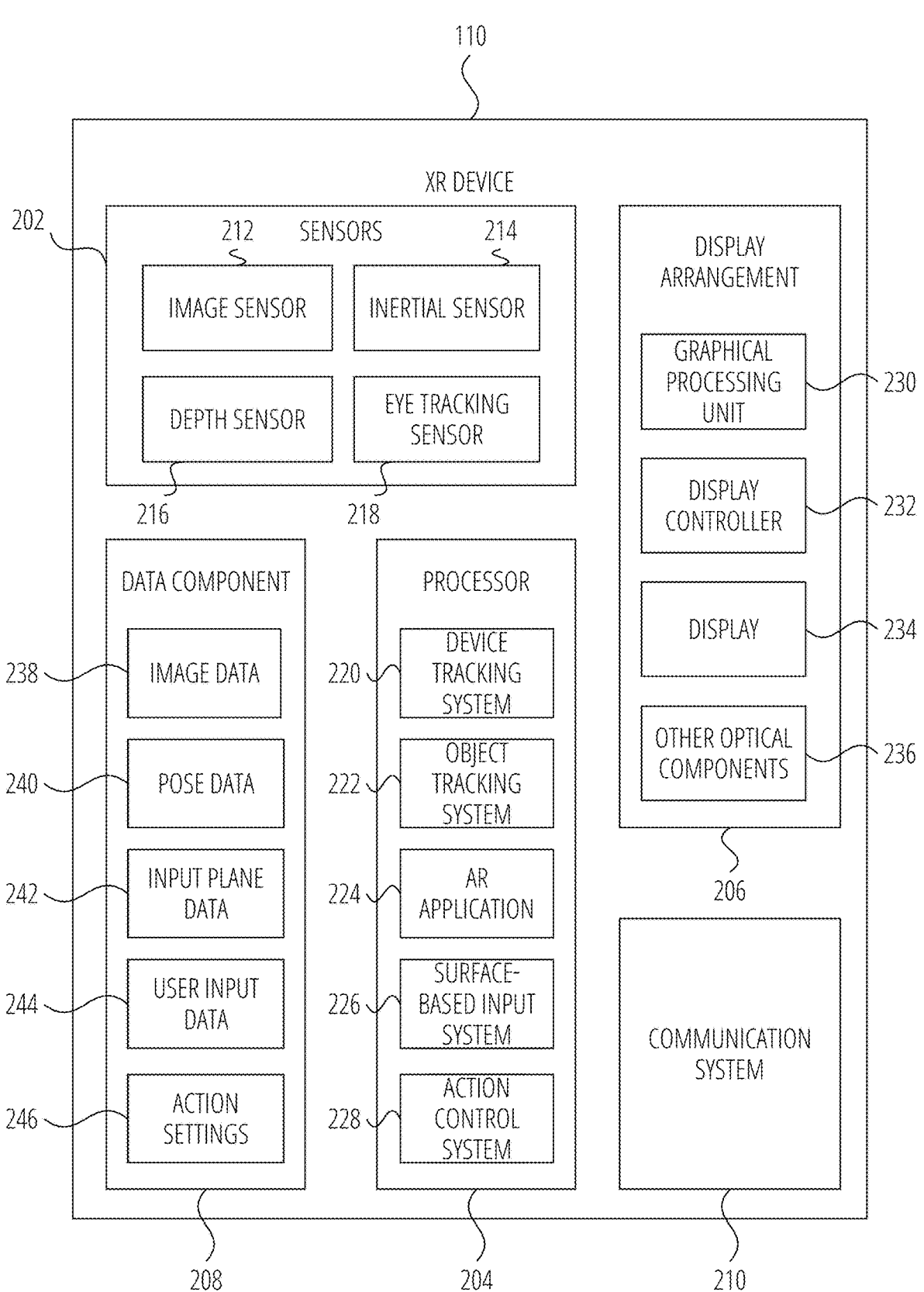
FIG. 2 is a block diagram illustrating components of an XR device, according to some examples.

FIG. 2 is a block diagram illustrating components (e.g., parts, modules, arrangements, systems, or subsystems) of the XR device 110, according to some examples. The XR device 110 is shown to include sensors 202, a processor 204, a display arrangement 206, a data component 208, and a communication system 210. It will be appreciated that FIG. 2 is not intended to provide an exhaustive indication of components of the XR device 110.

The sensors 202 include at least one image sensor 212, at least one inertial sensor 214, at least one depth sensor 216, and at least one eye tracking sensor 218. The image sensor 212 may include, for example, one or more of a color camera, a thermal camera, a depth sensor, and one or multiple grayscale, global shutter tracking cameras. The image sensor 212 may include combinations of different types of image sensors.

In some examples, the XR device 110 can include multiple outward-facing cameras, which work in conjunction to capture objects from different angles to facilitate triangulation of positions in the real world. These cameras can be used to track hand poses, gestures, and other fine movements by detecting and analyzing depth, angles, and positions in real time. This capability enables more precise interaction with virtual objects and environments.

The inertial sensor 214 may include a combination of a gyroscope, accelerometer, and a magnetometer. In some examples, the inertial sensor 214 includes one or more Inertial Measurement Unit (IMU). An IMU enables tracking of movement of a body by integrating the acceleration and the angular velocity measured by the IMU. The term "IMU" can refer to a combination of accelerometers and gyroscopes that can determine and quantify linear acceleration and angular velocity, respectively. The values obtained from the gyroscopes of the IMU can be processed to obtain the pitch, roll, and heading of the IMU and, therefore, of the body with which the IMU is associated. Signals from the accelerometers of the IMU also can be processed to obtain velocity and displacement.

The depth sensor 216 may include one or more of a structured-light sensor, a time-of-flight sensor, passive stereo sensor, and an ultrasound device. The eye tracking sensor 218 is configured to monitor the gaze direction of the user, providing data for various applications, such as data for determining where (from the perspective of the user) to position virtual user interface elements or other virtual objects. The XR device 110 may include one or multiple of these sensors, e.g., infrared eye tracking sensors, corneal reflection tracking sensors, or video-based eye-tracking sensors.

Other examples of sensors 202 that can be incorporated into the XR device 110 include a proximity or location sensor (e.g., near field communication, Global Positioning System (GPS), Bluetooth™, or Wi-Fi™), an audio sensor (e.g., a microphone), or any suitable combination thereof. It is noted that the sensors 202 described herein are for illustration purposes and the sensors 202 are thus not necessarily limited to the ones described above.

The processor 204 operates to implement a device tracking system 220, an object tracking system 222, an AR application 224, a surface-based input system 226, and an action control system 228.

The device tracking system 220 estimates a pose of the XR device 110. For example, the device tracking system 220 uses data from the image sensor 212 and the inertial sensor 214 to track a location and pose of the XR device 110 relative to a frame of reference (e.g., real-world environment 102). In some examples, the device tracking system 220 uses the image data 238 to determine the pose of the XR device 110. The pose may include a determined orientation and position of the XR device 110 in relation to the user's real-world environment 102.

In some examples, the device tracking system 220 continually gathers and uses updated sensor data describing movements of the XR device 110 to determine updated poses of the XR device 110 that indicate changes in the relative position and/or orientation of the XR device 110 from the physical objects in the real-world environment 102. The device tracking system 220 provides the pose of the XR device 110 to other components, such as the AR application 224 or a graphical processing unit 230 of the display arrangement 206.

A SLAM system may be used to understand and map a physical environment in real-time. This allows, for example, the XR device 110 to detect objects or regions (e.g., surfaces or 2D planes) to accurately place digital objects in the real world and track their position as a user moves and/or as objects move. The XR device 110 may include a VIO system that combines data from an IMU and a camera to estimate the position and orientation of an object in real-time. In some examples, a VIO system may form part of a SLAM system. A VIO system typically uses computer vision algorithms to analyze camera images and estimate the movement and position of the XR device 110, while also using IMU data to improve the accuracy and reliability of the estimates. By combining visual and inertial data, VIO may provide robust and accurate tracking.

The object tracking system 222 enables the tracking of an object, such as the physical object 108, a real-world surface or feature, or a hand of a person. The object tracking system 222 may include a computer-operated application or system that enables a device or system to track visual features identified in images captured by one or more image sensors, such as one or more cameras. In some examples, the object tracking system builds a model of a real-world environment based on the tracked visual features. An object tracking system may implement one or more object tracking machine learning models to track an object in the field of view of a user during a user session. The object tracking machine learning model may comprise a neural network trained on suitable training data to identify and track objects in a sequence of frames captured by the XR device 110. It typically uses an object's appearance, motion, landmarks, and/or other features to estimate location in subsequent frames.

In some examples, the object tracking system 222 implements a hand tracker of the XR device 110 that is specifically configured for human hand tracking. A hand tracker may include computer vision software that detects, identifies, and tracks hand positions and movements using input from one or multiple sensors. In some examples, the hand tracker processes image data from image sensors and/or depth sensors to detect hand landmarks representing joint positions and skeletal structure. The software implements computer vision algorithms to identify hands in captured images, track their motion over time, and determine hand poses. The hand tracker can track specific parts of a hand, such as fingertips, as they move in the real-world environment 102. The hand tracker can also provide details of predetermined landmarks, such as the locations of particular joints or other features of the hand. The hand tracker may utilize machine learning models or rules-based systems to distinguish between different users' hands and reject hands of irrelevant persons.

An XR device can be configured so as to perform egocentric hand tracking. In this context, "egocentric hand tracking" refers to hand tracking that is performed from a first-person perspective, with the "first person" being the user 106 of the XR device 110. For example, the user wears the XR device 110 on (or it is otherwise mounted on) their head, shoulder, or chest, capturing a scene substantially as the user 106 would see it. The XR device 110 thus tracks the position, orientation, or movement of the hand of the user 106 substantially from the viewpoint of the user.

The AR application 224 may retrieve a virtual object (e.g., 3D object model) based on an identified physical object 108 or physical environment (or other real-world feature), or retrieve a digital effect to apply to the physical object 108. The graphical processing unit 230 causes display of the virtual object, digital effect, or the like. In some examples, the AR application 224 includes a local rendering engine that generates a visualization of a virtual object overlaid (e.g., superimposed upon, or otherwise displayed in tandem with) on an image of the physical object 108 (or other real-world feature) captured by the image sensor 212. A visualization of the virtual object may be manipulated by adjusting a position of the physical object or feature (e.g., its physical location, orientation, or both) relative to the image sensor 212. Similarly, the visualization of the virtual object may be manipulated by adjusting a pose of the XR device 110 relative to the physical object or feature.

The surface-based input system 226 enables user input through interaction with physical surfaces. The surface-based input system 226 can, for example, be used to facilitate the providing of user input in the context of the AR application 224.

In some examples, the surface-based input system 226 processes data from multiple components, such as the image sensor 212, the inertial sensor 214, the device tracking system 220, or the object tracking system 222, to enable its functionality. In some examples, the surface-based input system 226 detects the presence of one or more input planes in the real-world environment 102 and tracks the positions of such one or more input planes during a user session. The surface-based input system 226 can also track a user input element, such as the hand of the user 106, to detect user input provided via a particular input plane.

For example, the surface-based input system 226 system tracks, using the object tracking system 222, a hand of the user 106 across multiple image frames to obtain positions of hand parts in the real-world environment 102. The surface-based input system 226 detects an input plane associated with a physical surface (e.g., using a SLAM system), which may include a surface of a user's palm or environmental surfaces such as tables. The surface-based input system 226 then projects the tracked positions of the hand onto the detected input plane and monitors the input state to identify when the user is providing input and to differentiate between ongoing and finalized input.

In some examples, the surface-based input system 226 employs neural network-based touch detection that considers multiple factors beyond simple distance thresholds. The surface-based input system 226 can process various types of input including one or more of digits, letters, words, sentences, signatures, unlock patterns, and gestures. For character recognition, the system may implement rotation-invariant processing to correctly interpret input regardless of surface orientation.

For moving surfaces such as the palmar surface of a hand, the surface-based input system 226 continuously tracks both plane position and hand position relative to the XR device 110, updating these positions for each image frame to maintain accuracy. In some examples, the surface-based input system 226 can handle multiple input planes simultaneously and adapt to different user preferences, such as left-handed or right-handed input.

In some examples, the surface-based input system 226 dynamically smooths or filters tracking data to stabilize the input plane before projecting finger positions onto the input plane. This can address or alleviate, for example, instability caused by slight movements of a hand or jitter of joints from hand tracking. The surface-based input system 226 can be configured to apply temporal smoothing to tracked hand landmark positions and/or the fitted input plane to reduce jitter caused by natural hand tremors or variations in joint tracking accuracy. For the palm surface specifically, the surface-based input system 226 may continuously monitor and filters the positions of landmarks such as the wrist, pinky finger joint, and index finger joint, using these smoothed positions to maintain a stable input plane even as the hand moves. In some examples, this smoothing process occurs before finger positions from the other hand are projected onto the palm surface, helping ensure accurate input recognition by compensating for the natural instability of the hand holding position and/or any tracking uncertainties in the hand joint detection.

In some examples, the surface-based input system 226 implements interpolation to smooth the input data and performs normalization before the XR device 110 interprets user input. The surface-based input system 226 may process multiple projected positions as part of a single user interaction, consolidating these positions once the input is finalized.

Once input has been detected and finalized by a user, the action control system 228 interprets the user input. For example, the action control system 228 determines an action that the XR device 110 is to be performed based on the input provided. In some examples, the action control system 228 works in coordination with the AR application 224 to execute actions based on the interpreted user input. These actions may include typing text, signing documents, unlocking a device, or controlling interface elements. The action control system 228 can also adjust the presentation of virtual content through the display arrangement 206 based on the processed and interpreted input.

Thus, the action control system 228 may receive processed input data from the surface-based input system 226 and determine appropriate responses or actions. For instance, when a user writes digits or letters on an input plane (e.g., a plane fitted or mapped to a hand palm or a relatively flat surface in the real-world environment 102), or traces a pattern or image onto the input plane, the action control system 228 can trigger corresponding display updates or system responses based on the interpreted input.

Referring to the display arrangement 206, the display arrangement 206 can include a display controller 232 and a display 234 in addition to the graphical processing unit 230. In some examples, the display arrangement 206 includes multiple displays. The display 234 may include a screen or panel configured to display images generated by the processor 204 or the graphical processing unit 230. In some examples, the display 234 may be transparent or semi-transparent so that the user 106 can see through the display 234.

In some examples, the display 234 may be offset from the gaze path of the user and other optical components 236 may direct light from the display 234 into the gaze path. The other optical components 236 may include, for example, one or more mirrors, one or more lenses, and one or more beam splitters.

Referring again to the graphical processing unit 230, the graphical processing unit 230 may include a render engine that is configured to render a frame of a 3D model of a virtual object based on the virtual content provided by the AR application 224 and the pose of the XR device 110 (and, in some cases, the position of a tracked object). In other words, the graphical processing unit 230 may use the pose of the XR device 110 to generate frames of virtual content to be presented on the display 234. For example, the graphical processing unit 230 uses the 3D pose to render a frame of the virtual content such that the virtual content is presented at an orientation and position in the display 234 to properly augment the user's reality. As an example, the graphical processing unit 230 may use the pose data to render a frame of virtual content such that, when presented on the display 234, the virtual content is caused to be presented to a user so as to overlap with a physical object in the user's real-world environment 102. In some examples, the virtual content is caused to be presented in a particular position relative to the input plane (e.g., the user writes on a surface of their hand and the XR device 110 causes corresponding markings to be virtually displayed to appear in the relevant areas in the real-world environment 102). The graphical processing unit 230 can generate updated frames of virtual content based on updated poses of the XR device 110 and updated tracking data generated by the abovementioned tracking components, which reflect changes in the position and orientation of the user in relation to physical objects in the user's real-world environment 102, thereby resulting in a more immersive experience.

In some examples, the graphical processing unit 230 transfers the rendered frame to the display controller 232. The display controller 232 is positioned as an intermediary between the graphical processing unit 230 and the display 234, receives the image data (e.g., rendered frame) from the graphical processing unit 230, re-projects the frame (e.g., by performing a warping process) based on a latest pose of the XR device 110 (and, in some cases, object tracking pose forecasts or predictions), and provides the re-projected frame to the display 234.

It will be appreciated that, in examples where an XR device includes multiple displays, each display may have a dedicated graphical processing unit and/or display controller. It will further be appreciated that where an XR device includes multiple displays, such as in the case of AR glasses or any other AR device that provides binocular vision to mimic the way humans naturally perceive the world, a left eye display arrangement and a right eye display arrangement may deliver separate images or video streams to each eye.

Where an XR device includes multiple displays, steps may be carried out separately and substantially in parallel for each display, in some examples, and pairs of features or components may be included to cater for both eyes. For example, an XR device may capture separate images for a left eye display and a right eye display (or for a set of right eye displays and a set of left eye displays), and render separate outputs for each eye to create a more immersive experience and to adjust the focus and convergence of the overall view of a user for a more natural, 3D view. Thus, while a single set of display arrangement components may be discussed to describe some examples, similar techniques may be applied to cover both eyes by providing a further set of display arrangement components.

Still referring to FIG. 2, the data component 208 stores various data types used by the XR device 110, including one or more of image data 238, pose data 240, input plane data 242, user input data 244, and action settings 246. The image data 238 may include data captured from the image sensor 212, such as raw image frames, processed image data, and data related to detected hand positions, detected planes, or movements in the real-world environment.

The pose data 240 contains information about the spatial positioning and orientation of tracked objects, such as hand pose information used for detecting user interactions with input planes. The pose data 240 may include 3D position data that is converted to 2D position data when projected onto detected input planes.

The input plane data 242 can include information about detected physical surfaces that can serve as input planes, including palmar surfaces (or other body surfaces, such as the dorsal surface of the hand) and environmental surfaces such as tables, walls, counters, or the like. The input plane data 242 may include 3D reconstruction information, plane fitting parameters, and calculated projection errors used to identify and select optimal or near-optimal input planes.

The user input data 244 may include recorded projected positions and interpreted user interactions, including ongoing and finalized input states. The user input data 244 may store multiple projected positions for a single user interaction before they are consolidated for unified interpretation, such as when a user writes multiple strokes to form a single character or makes multiple markings to create an input pattern or image to be interpreted by the XR device 110. The user input data 244 may also include settings for interpreting or recognizing user input, such as parameters for input interpretation methods including OCR, image classification, or rotation normalization.

The action settings 246 contain configuration data related to how different types of user input should be processed and what actions should be executed in response (e.g., by the action control system 228). For example, the action settings 246 can cause the XR device 110 to be unlocked when the XR device 110 detects an input in the form of a correct unlock pattern.

Referring now to the communication system 210 of the XR device 110 as shown in FIG. 2, the communication system 210 is configured to enable the XR device 110 to communicate with other XR devices and/or with other systems, such as remote servers. In some examples, the communication system 210 allows the XR device 110 to connect and share data with colocated devices.

The communication system 210 can utilize one or more wireless communication protocols, specialized APIs, and/or cloud-based services. For example, the communication system 210 is used to establish a local peer-to-peer connection or uses a central cloud server to facilitate the exchange of data. In each case, the communication system 210 enables a communication link between the two devices.

Local connections may use protocols such as Wi-Fi Direct, Bluetooth Low Energy (BLE), or ultra-wideband (UWB) for discovery or proximity-based communication, enabling the devices to share data in real time with minimal latency. Some devices may also utilize protocols such as 5G for high-bandwidth, low-latency connections, such as in scenarios requiring extended spatial maps or larger datasets. End-to-end encryption can be employed to protect data during transmission, ensuring privacy and security for users in collaborative or shared environments.

Figure 3:
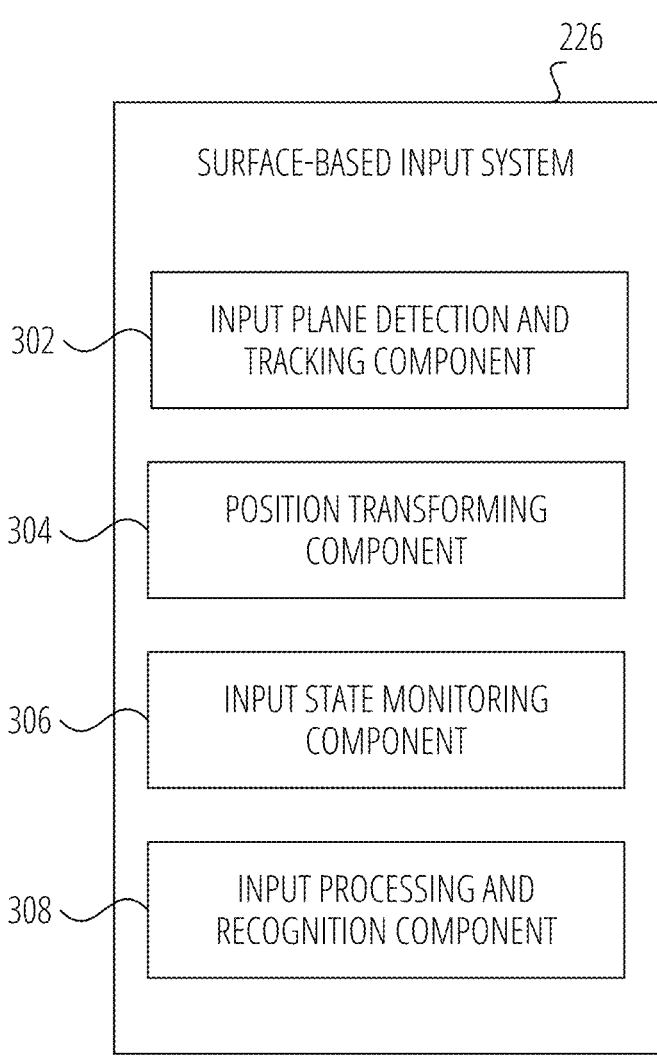
FIG. 3 is a block diagram illustrating components of a surface-based input system of an XR device, according to some examples.

FIG. 3 is a block diagram illustrating components (e.g., parts, modules, arrangements, systems, or subsystems) of the surface-based input system 226 of FIG. 2, according to some examples. The surface-based input system 226 is shown to include an input plane detection and tracking component 302, a position transforming component 304, an input state monitoring component 306, and an input processing and recognition component 308.

The input plane detection and tracking component 302 may employ various algorithms, including for example computer vision and/or machine learning techniques, to identify and track input surfaces in the real-world environment. For palm-based input surfaces, the input plane detection and tracking component 302 can work with a hand tracker of the XR device 110 to track multiple hand landmarks, such as wrist position and finger joint locations, to fit an input plane representing the palmar surface. In some examples, the input plane detection and tracking component 302 uses at least a wrist landmark and one or more finger joint landmarks (e.g., one, two, or more knuckle joints).

The input plane detection and tracking component 302 may thus fit an input plane to 3D tracked hand landmark positions to represent a palmar surface. In one specific example, the landmarks include 3D positions of the wrist, pinky finger joint, and index finger joint. The input plane detection and tracking component 302 and/or object tracking system 222 continuously updates these landmark positions as the hand moves to maintain an accurate representation of the palm plane relative to the XR device 110.

In some examples, the input plane detection and tracking component 302 works with the device tracking system 220 to generate a 3D reconstruction of the environment using SLAM or other similar algorithms to detect planes suitable for user input. The input plane detection and tracking component 302 may identify multiple potential input planes and calculate projection errors associated with each, selecting the optimal or near-optimal plane that minimizes these errors. For 3D geometry-based plane fitting of environmental surfaces, the input plane detection and tracking component 302 may analyze the 3D reconstruction to identify potential input planes based on a scene mesh. When identifying potential input planes in the environment, the input plane detection and tracking component 302 may calculate how far the reconstructed 3D points deviate from each candidate plane surface. For example, the input plane detection and tracking component 302 selects the input plane that minimizes these deviations or projection errors, meaning it finds the plane that best matches the actual physical surface geometry captured in the 3D reconstruction.

In some examples, the input plane detection and tracking component 302 performs image-based plane detection without necessarily using a full 3D reconstruction of a scene. For example, the input plane detection and tracking component 302 runs a trained machine learning model to analyze features in image frames to detect flat surfaces that can serve as input planes (e.g., using a trained neural network).

In some examples, the position transforming component 304 handles the conversion of 3D input element data, such as hand tracking data, into 2D in an input plane space. In some examples, the position transforming component 304 continuously tracks both the plane position relative to the XR device 110 and the hand position, updating these positions for each captured frame. The position transforming component 304 projects the 3D fingertip positions onto the detected input plane using, for example, dot product calculations, and may perform interpolation between projected points to create smooth continuous input paths. When the input plane moves relative to the XR device 110, the position transforming component 304 maintains accurate projections by continuously updating both the plane and hand positions. As used herein, "projected positions" may thus include 2D coordinates on an input plane that result from projecting 3D tracking data onto the input plane.

Accordingly, in some examples, the surface-based input system 226 runs the position transforming component 304 to transform positions of an input element (e.g., a fingertip) from an image space or world space so as to be represented in an input plane space.

The input state monitoring component 306 is responsible for monitoring the input state during a session. The input state monitoring component 306 may use computer vision, neural networks, and/or other techniques to detect and track user input states or aspects thereof. In some examples, the input state monitoring component 306 employs a convolutional neural network trained on labeled touch/no-touch interaction data to determine when a user is actively touching a surface to provide input.

The input state monitoring component 306 may process multiple input features, such as distance to plane, local surface geometry, and temporal information to differentiate between ongoing input and finalized input states. The input state monitoring component 306 may also track multiple projected positions as part of a single user interaction, maintaining the input state until the interaction is completed. The input state monitoring component 306 is thus, in some examples, configured not only to detect when a user is providing input but also whether the input is finalized (and should thus be interpreted and acted upon) or still ongoing (e.g., the user is still in the process of drawing the relevant letter, number, or shape).

In some examples, the input state monitoring component 306 is further configured to differentiate between relevant and irrelevant engagements with the input plane. For example, a neural network is trained to distinguish between the user inputting relevant information and the user simply moving their finger in preparation for starting a new stroke.

The input state monitoring component 306 can also be configured to identify that the user is interacting with the input plane even when the user is not directly touching the input plane. For example, where the input plane is fitted to the palm using joints of the hand, the input plane is spaced apart from the actual outer surface of the hand. Thus, the input state monitoring component 306 may detect a "touch" or "engagement" with respect to the input plane if the relevant part of the hand is within a predetermined distance (e.g., 1.5 cm, 2 cm, or 2.5 cm) from the input plane.

The input processing and recognition component 308 may use computer vision, machine learning algorithms, and/or other techniques to interpret the recorded user input. In some examples, the input processing and recognition component 308 uses OCR or other models to detect written text and digits, with the models being rotation-invariant or incorporating rotation normalization to handle input at different angles. For gesture-based input or input that is in the form of images or non-text objects, the input processing and recognition component 308 may employ image classification. For example, the input processing and recognition component 308 can run image classification models to detect whether an unlock pattern or user signature has been correctly provided.

In some examples, the input processing and recognition component 308 processes the input in the projected plane space (e.g., the 2D coordinates expressed relative to the input plane) rather than image space (e.g., the original 3D tracked positions of the hand) to handle various surfaces properly (e.g., surface that are tilted relative to XR device cameras), and may apply additional preprocessing steps such as temporal smoothing and stroke consolidation.

Various machine learning models can be used in the context of the surface-based input system 226, e.g., to perform or facilitate functions of the input plane detection and tracking component 302, the input state monitoring component 306, and/or the input processing and recognition component 308.

For example, the surface-based input system 226 can use a machine learning model for touch detection comprising a convolutional neural network specifically designed to process image data from the XR device's sensors. The architecture may include multiple convolutional layers with activation functions, followed by fully connected layers that output a binary classification indicating touch or no-touch states.

The model may process input data including image frames from an image sensor, depth maps from a depth sensor, and/or hand tracking data providing 3D positions of hand landmarks. The input features may be preprocessed through normalization and may include one or more of: distance between fingertip and detected plane, local surface geometry around potential contact point, temporal information from previous frames, or hand pose parameters including joint angles and positions.

The model may be trained using supervised learning on a dataset of labeled touch/no-touch interactions. The training process may employ stochastic gradient descent with momentum, using a binary cross-entropy loss function. The training data can include examples of various hand sizes, orientations, and interaction scenarios to ensure robust performance. The training dataset may comprise recorded sequences of users performing touch interactions on different surfaces, including palmar surfaces and environmental planes. Each sequence may be labeled to indicate frames where actual contact occurs.

Input preprocessing may include normalizing distances to a standard range, extracting local geometry features around potential contact points, computing relative motion between fingertip and surface, and/or generating temporal context windows of multiple frames. In some examples, the model outputs a continuous value between 0 and 1 representing touch confidence, which is thresholded to make the final touch/no-touch determination. Additional post-processing may include temporal smoothing to reduce jitter and false detections. The model may be periodically fine-tuned using new interaction data collected from deployed devices, allowing it to adapt to different user interaction patterns and environmental conditions.

For example, when a finger makes contact with the palm to begin a stroke for drawing a number or letter, a model executed using the input state monitoring component 306 outputs a high confidence value (close to 1) indicating a touch state, allowing the XR device 110 to begin recording the input. The touch state continues as the finger maintains contact during the stroke, with the model continuously monitoring the interaction parameters to ensure accurate touch detection.

In contrast, when the user lifts their finger between strokes (for example, after completing the vertical stroke of the "7" and before starting the horizontal stroke), the touch detection model processes the same input features but detects the absence of contact. The increased distance between fingertip and palmar surface, changes in local geometry features, and temporal patterns indicating lifting motion cause the model to output a low confidence value (close to 0), signaling a no-touch state. This allows the XR device 110 to properly segment strokes and avoid recording unintended movements when the finger is not in contact with the input surface.

In some examples, a machine learning model such as the model for touch detection can be deployed on the XR device's onboard processors and integrated with its hand tracking and plane detection systems. Similar techniques may be used to train and deploy other models, such as a model for determining whether user input is ongoing or finalized, a model for gravity-aware input recognition, and/ or a rotation-invariant recognition model.

In some examples, a model for determining whether user input is ongoing or finalized may be trained using supervised learning on a dataset of labeled interaction sequences. The training data may include recordings of users performing various writing, drawing, or gesture interactions on different surfaces, with each sequence labeled to indicate transition points between ongoing and finalized states. The model may process multiple input features including temporal patterns of finger movement, changes in hand pose, lifting motions away from the input plane, and/or contextual cues from previous frames to detect these state transitions. For example, the model is trained to detect, based on a particular image frame or sequence of frames, whether, at a given point in time, the user is still interacting with the input plane or is instead done and expecting a result. In some examples, the model outputs a continuous value between 0 and 1 representing finalization confidence, which is thresholded to make the final ongoing/finalized determination.

Such an ongoing/finalized detection model may be deployed (e.g., alongside a touch detection model) on the XR device's onboard processors (e.g., by the input state monitoring component 306), with both models potentially sharing preprocessed sensor data and hand tracking information. The model outputs may be combined with other contextual information, such as the type of interaction being performed (e.g., multi-stroke characters versus single-stroke gestures), to make the final determination about input state. The system may employ temporal smoothing and other post-processing techniques to prevent false transitions, particularly in cases where users briefly pause during multi-stroke inputs.

For example, when a user writes the number "7" on their palm, the XR device 110 tracks the fingertip position as it makes contact with the palm surface. The input processing and recognition component 308 processes this input in multiple stages: first detecting when the vertical stroke begins through a touch detection neural network, then tracking the continuous motion until the finger lifts, followed by detecting the beginning of the horizontal stroke when the finger touches again. A neural network model trained on temporal patterns and movement characteristics, as discussed above, determines that while the vertical stroke is finalized, the overall user interaction is likely still in progress. When the finger touches again, the user begins a horizontal stroke and the XR device 110 treats this as part of the same user interaction, maintaining the full context with respect to the writing of the number on the palmar surface. The XR device 110 projects these 3D finger positions onto the detected palm plane and consolidates them into a unified set of 2D coordinates based on the monitored input state. An OCR model may then, for example, process these coordinates, accounting for different writing styles (with or without the horizontal stroke) and any rotation of the input plane, to recognize the number.

For an unlock pattern, the XR device 110 may similarly track finger contact with the input surface but processes the input using image classification rather than OCR. As the user draws their unlock pattern (for example, connecting virtual dots in a specific sequence), the touch detection model continuously monitors finger contact while the position projection component maps the 3D finger movements onto the input plane. The XR device 110 records these projected positions as a continuous gesture path, with a neural network model monitoring temporal patterns and movement characteristics to determine when the gesture is complete. The model analyzes features such as lifting motions, changes in movement speed, and completion of expected pattern sequences to identify when the unlock gesture has been finalized. Once finalized, the image classification model analyzes the complete pattern against stored templates to authenticate the unlock sequence.

In some examples, a gravity-aware input recognition model is run using the input processing and recognition component 308. Such a model can process data to determine the orientation of an input plane relative to gravity. The model may be trained on a dataset of input sequences captured at various orientations, with the gravity direction serving as a reference vector for normalizing the input. When processing input, the model uses the gravity direction to transform the captured strokes into a normalized orientation, allowing for consistent recognition regardless of how the user, device, or input surface is positioned. For example, when a user writes on their palm, the model can determine whether an input resembling an "8" should be interpreted as the number "8" or an infinity symbol based on its orientation relative to gravity, as users typically write numbers aligned with their perception of "down."

In some examples, a rotation-invariant recognition model is run using the input processing and recognition component 308 to identify input patterns regardless of their orientation in space. The model architecture may employ specialized convolutional neural network layers that maintain recognition accuracy across different rotations of the input. Rather than normalizing the input based on gravity or other reference vectors, this model learns rotation-invariant features directly from the training data, which includes examples of the same patterns oriented at different angles. This approach can be useful for recognizing symbols or gestures that may be valid in multiple orientations, or when the input plane's orientation cannot be sufficiently reliably determined relative to a fixed reference.

As mentioned above, the XR device 110 can also employ a suitably trained neural network or other machine learning model for identifying input planes (or potential input planes) in a scene.

The XR device 110 can thus execute multiple models, locally and/or via a connected server. It will be appreciated that machine learning models can be executed in conjunction with other algorithms or techniques, such as rules-based systems that analyze distances between the hand and an input plane or temporal progression. Thus, machine learning models as described herein can be used in the surface-based input system 226 together with other algorithms or techniques, such as geometry-based cues (e.g., using hand shape to detect touch/no-touch or ongoing/finalized states as discussed), general heuristics (e.g., using a distance to plane calculation result), and/or temporal context (e.g., checking a sequence of frames to determine whether a digit is moving towards/away from the plane). Furthermore, in at least some cases, such other algorithms or techniques can be employed in the surface-based input system 226 as alternatives to employing one or more of the machine learning models.

One or more of the components described herein, such as components shown in FIG. 2 or FIG. 3, may be implemented using hardware (e.g., a processor of a machine) or a combination of hardware and software. For example, a component described herein may configure a processor to perform the operations described herein for that module. Moreover, two or more components may be combined into a single component, and the functions described herein for a single component may be subdivided among multiple components. Furthermore, according to various examples, components described herein as being implemented within a single machine, database, or device may be distributed across multiple machines, databases, or devices.

Figure 4:
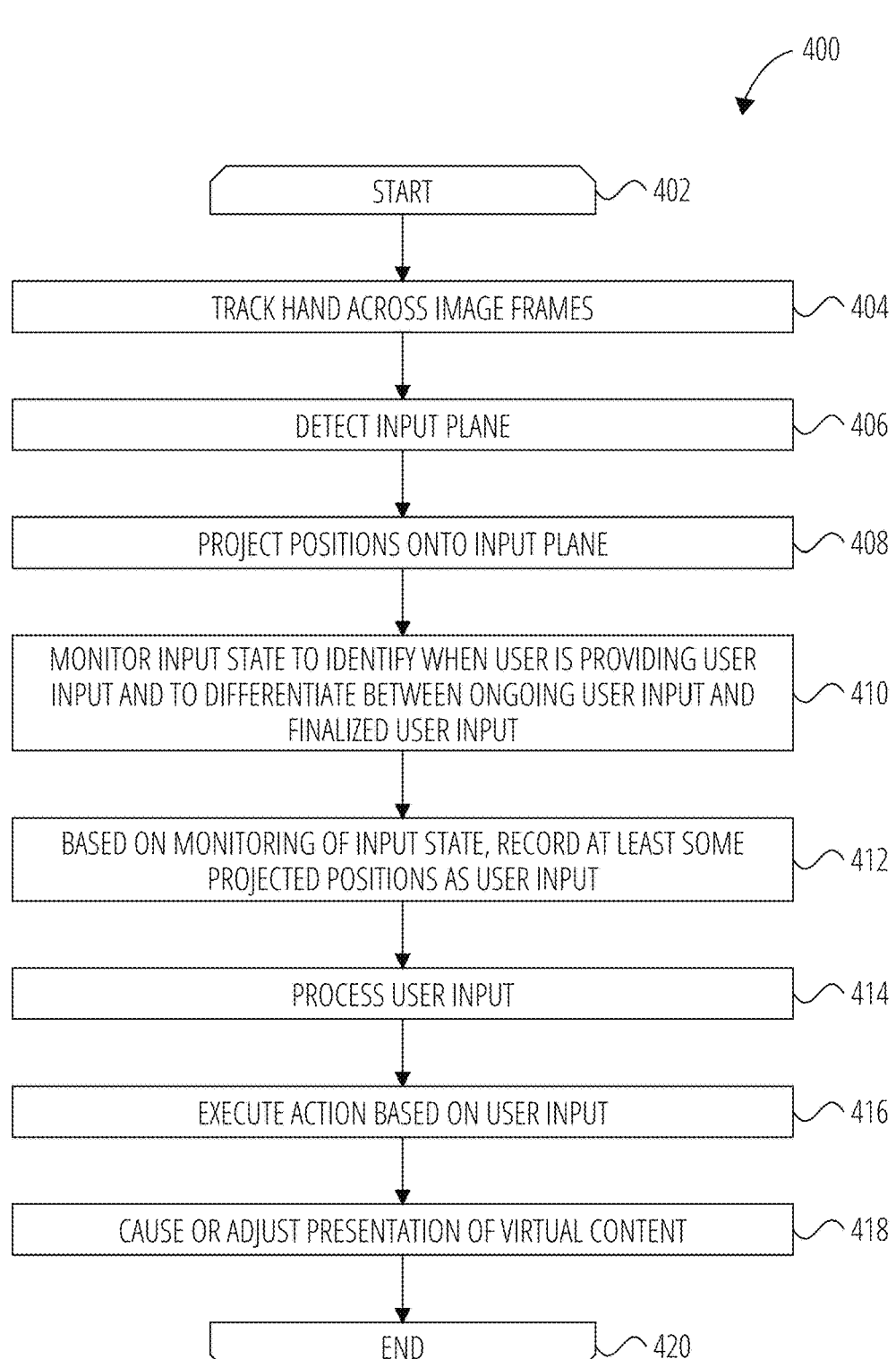
FIG. 4 is a flowchart illustrating a method of detecting and interpreting user input provided to an XR device, according to some examples.

FIG. 4 is a flowchart illustrating a method 400 of detecting and interpreting user input provided to an XR device, according to some examples. The method 400 enables a user to utilize a surface-based user input mechanism in an XR environment. The method 400 can be performed by an XR device such as the XR device 110 described with reference to FIG. 1 to FIG. 3. Accordingly, and by way of example only, operations in the method 400 are described below as being performed by the XR device 110.

The method 400 commences at opening loop operation 402. For example, the user 106 starts a session on the XR device 110 and opens the AR application 224. The AR application 224 allows the user 106 to provide input by, for example, writing or drawing on a real-world surface in a manner resembling the use of a virtual drawing board. Depending on the implementation, an input plane that provides this "virtual drawing board" may be displayed to the user 106 via the display arrangement 206 of the AR application 224 (e.g., overlaid onto the relevant real-world surface to provide a visual indicator) or the user 106 may simply write or draw on the relevant real-world surface with only the real-world surface being visible to them.

The method 400 proceeds to operation 404, where the XR device 110 tracks a hand of the user 106 across multiple image frames captured by the image sensor 212 to obtain positions of the hand in the real-world environment 102. For example, the XR device 110 runs a hand tracker to track the position of the hand, including one or more of its fingertips, in the real-world environment 102. In some examples, the XR device 110 tracks both hands of the user 106.

At operation 406, the XR device 110 detects an input plane. For example, the surface-based input system 226 tracks both hands of the user 106 and detects the palmar surface of the left hand as an input plane (with the right hand being the input element in such a case). As another example, the surface-based input system 226 detects the dorsal surface of the left hand as an input plane. In some examples, the XR device 110 automatically uses a non-dominant hand of the user 106 as the input surface and the user uses one or more digits of their dominant hand to touch a surface (e.g., the palmar or dorsal surface) of the non-dominant hand to provide user input. As another example, the surface-based input system 226 detects a top surface of a table or top of a counter in the real-world environment 102 as the input plane. In such cases, the user 106 uses one or more digits of their hand or hands to touch the surface of the table or counter (or other real-world surface) to provide user input. As mentioned, various techniques can be used to detect and track the input plane, including fitting the plane to hand landmarks, 3D geometry-based plane fitting, and image-based plane detection. As also mentioned, smoothing or filtering can be employed to stabilize the tracked position of the input plane (e.g., before projecting hand positions from another hand onto the input plane).

In the method 400, the XR device 110 continuously tracks the hand of the user 106 relative to the input plane. For example, as the user 106 touches the palmar surface of their non-dominant hand, the XR device 110 captures images including images of the hands of the user 106. For example, the XR device 110 utilizes one or more cameras to capture tracking data, e.g., the image data 238 and pose data 240. The XR device 110 uses a touch/no-touch detection system of the surface-based input system 226 to detect the hand touching the input plane and identifies the position of engagement.

In various examples, the user input includes not only a single touch or tap but rather an extended interaction. The user 106 can provide such user input in various ways. For example, the user 106 provides input by writing digits, letters, words, or sentences on the relevant real-world surface with their hand or another input tool, by writing or tracing their signature on the surface, by drawing a specific pattern (e.g., an unlock pattern), or by performing a gesture such as two-fingered scrolling or zooming. The user input can be provided for various purposes, such as entering text to the AR application 224, unlocking or locking the XR device 110, making notes or drawings, providing a signature, editing a content item displayed by the AR application 224, adjusting a virtual user interface of the AR application 224 (e.g., by scrolling or zooming), or the like.

At operation 408, the XR device 110 projects tracked positions of the hand onto the input plane. For example, the user 106 uses their index finger to touch or swipe across the relevant real-world surface, and the XR device 110 continuously projects the position of the fingertip of the index finger onto the input plane associated with the real-world surface. For example, since the XR device 110 has knowledge of the positions of both the hand and the input plane relative to the XR device 110, the XR device 110 uses a dot product calculation to transform the 3D position of the fingertip in the real-world environment 102 to a 2D position on the input plane. It is noted that the XR device 110 may track multiple points simultaneously, e.g., two different fingertips used for two-fingered scrolling, and can thus project multiple sets of positions onto the input plane, tracking progression of their trajectories during the session.

The XR device 110 continuously monitors an input state with respect to the input plane (operation 410). In this way, the XR device 110 can identify when the user 106 is providing user input via the input plane. For example, the surface-based input system 226 detects when the user 106 is touching or engaging the relevant real-world surface. Furthermore, the XR device 110 can identify whether a particular user input is associated with a finalized user interaction or part of an ongoing user interaction. As described elsewhere in the present disclosure, the surface-based input system 226 can employ machine learning-based input state monitoring and may also consider other factors, such as temporal context, distance metrics, and movement patterns.

At operation 412, based on the monitored input state, the XR device 110 records specific projected positions as user input. For example, the XR device 110 records, as user input, projected positions for all time instants when the hand is touching/engaging the input plane and, based on identifying whether user input is ongoing or finalized, bundles all projected positions that are part of the same user interaction together for downstream analysis. In other words, when the input state indicates active input, the XR device 110 captures and stores the projected positions corresponding to the points in time when the active input was provided, which may include multiple strokes forming a single user interaction.

In some examples, after the user 106 starts providing user input, and in response to subsequently detecting that user input has been finalized, the XR device 110 selects each projected position that formed part of that interaction for downstream interpretation. Accordingly, while the input state indicates that the user input is ongoing, the XR device 110 may record multiple projected positions as user input for a single user interaction. Upon detecting a transition in the input state indicating that the user input is finalized, the XR device 110 can then consolidate the multiple projected positions recorded for the single user interaction for unified interpretation.

The XR device 110 processes the relevant user input at operation 414. For example, the user 106 writes a letter or word via the input plane, and the XR device 110 detects the letter or word using OCR. As another example, the user 106 draws an image or symbol via the input plane, and the XR device 110 runs an image classification model to identify the image or symbol. This enables the XR device 110 to interpret the user input. By knowing when user input is ongoing and when it is finalized, the XR device 110 can correctly bundle or consolidate tracked and projected positions and then interpret such sets of positions (e.g., representing a letter, word, or drawing) as a whole to understand the correct meaning.

In some examples, the XR device 110 is specifically configured to handle user input provided at varying orientations or angles relative to the XR device 110. For example, the XR device 110 normalizes the input based on the detected gravity direction (e.g., as reported by an IMU of the XR device 110) or runs rotation-invariant OCR.

At operation 416, the XR device 110 executes an action based on the interpreted user input. For example, the action control system 228 receives the interpreted input and performs one or more corresponding functions, such as text entry, signature verification, or interface control. As a result, virtual content is presented or adjusted by the XR device 110 at operation 418. For example, items in a user interface presented to the user 106 via the display arrangement 206 may be dynamically updated by the XR device 110. The method 400 concludes at closing loop operation 420.

Figure 5:
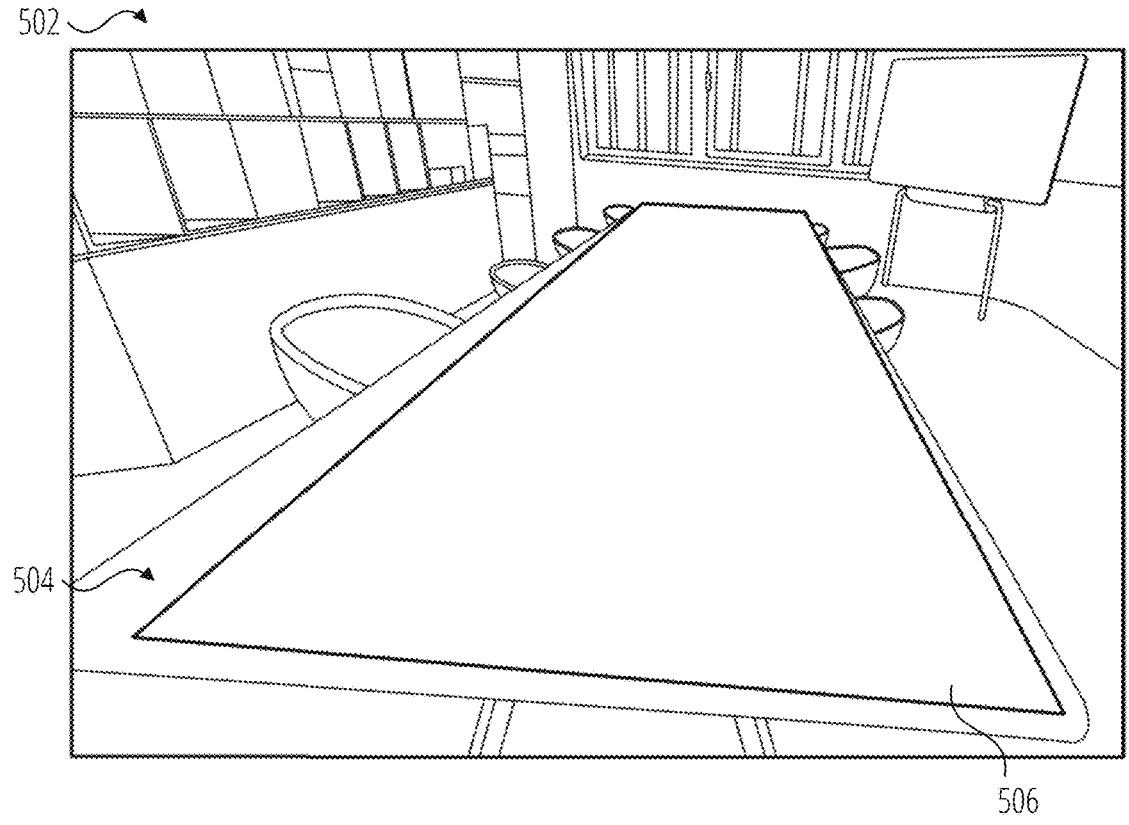
FIG. 5 is a perspective view of a real-world environment from the perspective of a user of an XR device, according to some examples.

FIG. 5 is a perspective view of a real-world environment 502 from the perspective of a user of an XR device, according to some examples. For example, the XR device is the XR device 110 of FIG. 1 to FIG. 3, which may be operated as a head-worn device by the user 106, and FIG. 5 illustrates what the user 106 sees during a user session.

FIG. 5 shows various real-world objects in the real-world environment 502, including a table 504 located in a conference room. The XR device 110 detects and tracks physical surfaces, and can associate an input plane with one or more of these surfaces. For example, the XR device detects a top surface of the table 504 as an input plane 506. Subsequently, the XR device records user input provided via the input plane 506. This allows the user 106 to write or draw on the table surface as if it were a virtual drawing board, with the XR device 110 projecting tracked finger positions within its field of view onto the input plane 506 and monitoring the input state to identify when the user 106 is providing input. FIG. 5 thus exemplifies how the XR device can utilize arbitrary environmental surfaces as input planes by scanning the relevant environment, for example, for sufficiently flat surfaces or planar elements.

Figure 6:
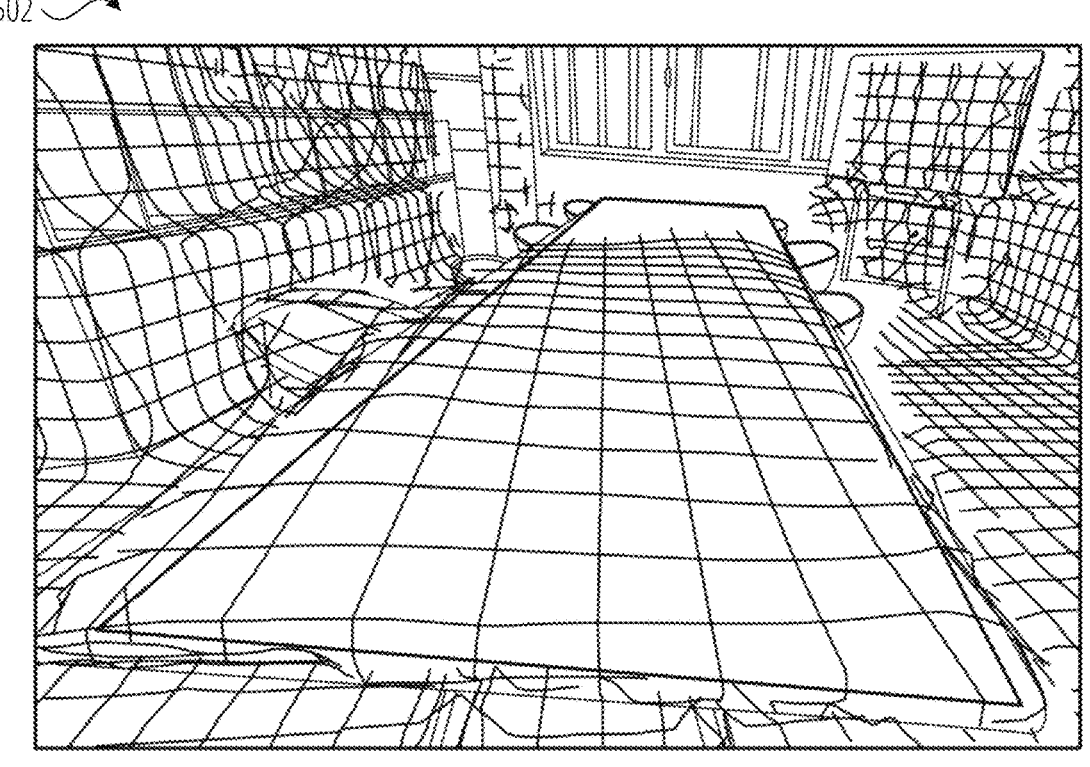
FIG. 6 is a perspective view of the real-world environment of FIG. 5, further illustrating a scene mesh as generated by the XR device for the real-world environment, according to some examples.

In some examples, the system reconstructs the surrounding 3D environment using SLAM or similar algorithms to estimate planes by minimizing projection errors. FIG. 6 conceptually illustrates how the XR device 110 generates a mesh or grid representation of detected surfaces, which may be referred to as a scene mesh.

In some examples, the XR device 110 continuously reconstructs the surrounding environment, creating a detailed mesh representation where the table 504 and surrounding environment are mapped with a grid-like mesh structure. This mesh reconstruction is analyzed by the XR device 110 to identify potential input planes by calculating projection errors for different surface candidates and selecting the plane that minimizes these errors.

The XR device 110 may maintain and updates this surface mesh in real-time as the XR device 110 moves relative to the environment, allowing for continuous tracking of detected input planes and ensuring accurate projection of user input onto these surfaces.

FIG. 7 to FIG. 10 provide perspective views of a real-world environment 702 from the perspective of a user of an XR device, according to some examples, at different points in time during a user session. For example, the XR device is the XR device 110 of FIG. 1 to FIG. 3, which may be operated as a head-worn device by the user 106.

Figures 7, 8:
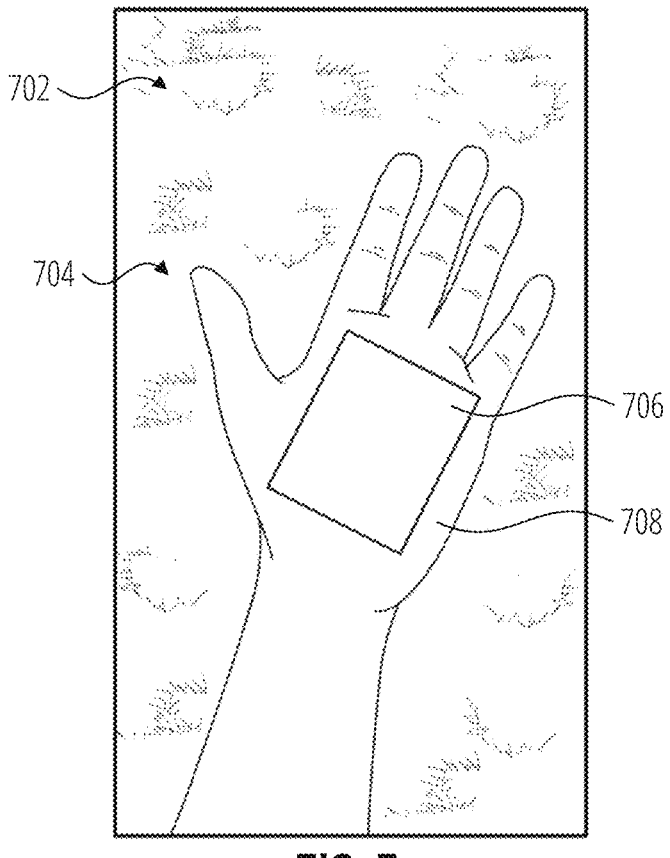
FIG. 7 is a perspective view of a real-world environment from the perspective of a user of an XR device at a first point in time during a user session, according to some examples, illustrating a first hand of the user and an input plane detected by the XR device.
FIG. 8 is a perspective view of the real-world environment of FIG. 7 at a second point in time during the user session, according to some examples, illustrating the first hand of the user, a second hand of the user, and the input plane.

FIG. 7 to FIG. 10 illustrate a sequence showing palm-based input. FIG. 7 shows the real-world environment 702 at a first point in time, and illustrates a first hand 704 of the user 106 and an input plane 706 detected by the XR device 110. The first hand 704 is the non-dominant hand of the user 106 and the input plane 706 is fitted to predetermined hand landmarks as tracked by the XR device 110. The input plane 706 represents a palmar surface 708 of the first hand 704. It is noted that while the input plane 706 is shown in FIG. 7 for illustrative purposes, in some examples the user 106 is not presented with a view of the input plane 706, while the XR device 110 uses the input plane 706 internally for detection and tracking of input, as discussed elsewhere in the present disclosure.

FIG. 8 shows the real-world environment 702 at a second point in time. FIG. 8 also illustrates a second hand 802 of the user 106. The second hand 802 is the dominant hand of the user 106 and is used to provide input by writing or drawing on the palmar surface 708 (and thus essentially on the input plane 706). The XR device 110 tracks a position 804 of a fingertip 806 of the index finger of the second hand 802 as it moves to write on the palmar surface 708. For example, the surface-based input system 226 tracks the finger movements and dynamically determines both when the user 106 provides input and whether a particular input position is part of ongoing user input.

Figure 9:
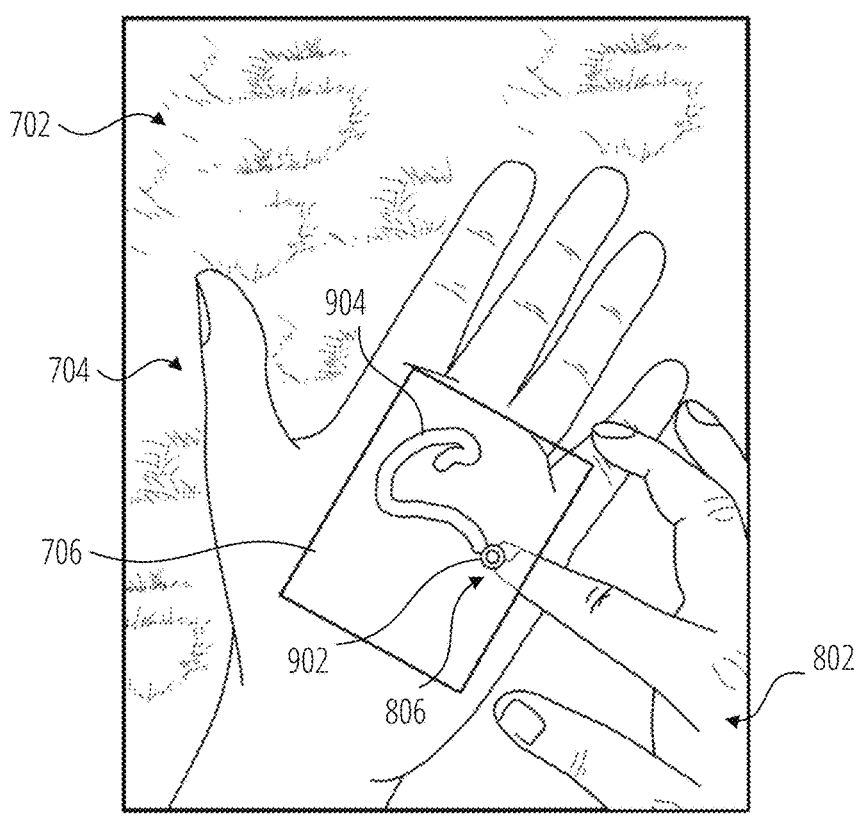
FIG. 9 is a perspective view of the real-world environment of FIG. 7 at a third point in time during the user session, according to some examples, illustrating the first hand and the second hand of the user, and further illustrating the user providing user input via the input plane.

FIG. 9 shows the real-world environment 702 at a third point in time. FIG. 9 illustrates a further position 902 of the fingertip 806 as tracked by the XR device 110. With respect to the third point in time, the XR device 110 uses the surface-based input system 226 and determines that the user input is ongoing input 904 (e.g., the user 106 is still in the process of completing the input).

Figure 10:
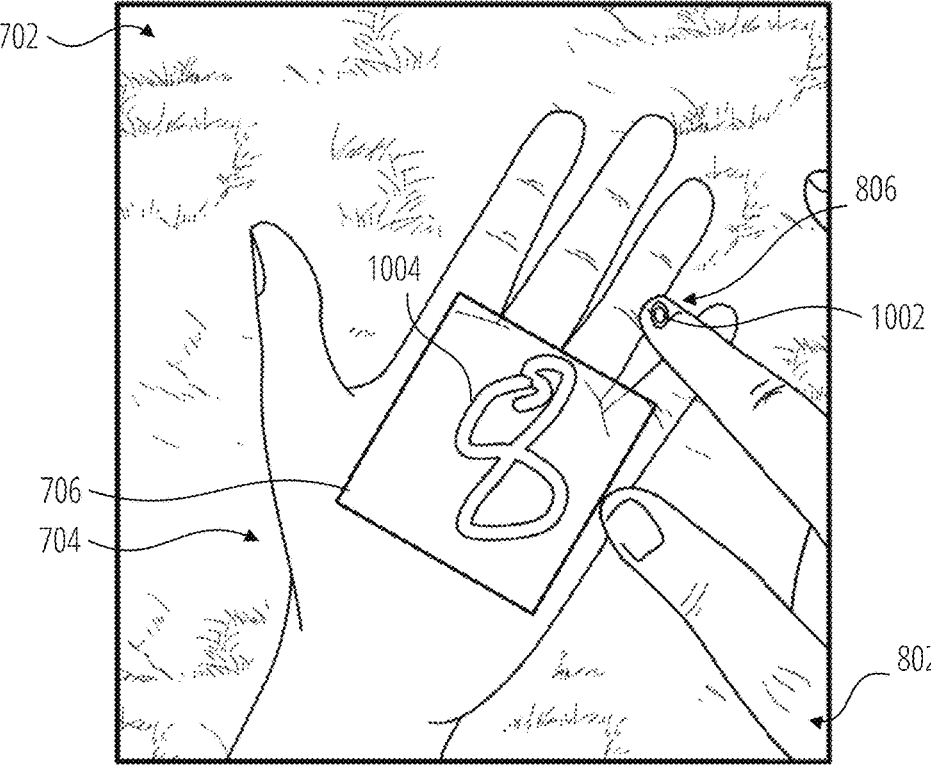
FIG. 10 is a perspective view of the real-world environment of FIG. 7 at a fourth point in time during the user session, according to some examples, illustrating the first hand and the second hand of the user, where the user has completed providing the user input via the input plane.

FIG. 10 shows the real-world environment 702 at a fourth point in time. FIG. 10 illustrates a further position 1002 of the fingertip 806 after the fingertip 806 is moved away from the input plane 706 (e.g., lifted up and away from the palmar surface 708). The user 106 has finalized the user input and the surface-based input system 226 is used to detect that the input is finalized input 1004. Merely as an example, it is shown that the user 106 writes the number "8" via the input plane 706. The XR device 110 then processes and interprets the finalized input 1004.

As described elsewhere in the present disclosure, in some examples, interpretation of the finalized input 1004 does not occur in the image space as shown in FIG. 7 to FIG. 10, but rather in a reconstructed input plane space as depicted in FIG. 11 to FIG. 14. Specifically, FIG. 11 to FIG. 14 show a reconstruction 1102 of a scene generated for the real-world environment 702, according to some examples, at different points in time during the user session.

Figure 11:
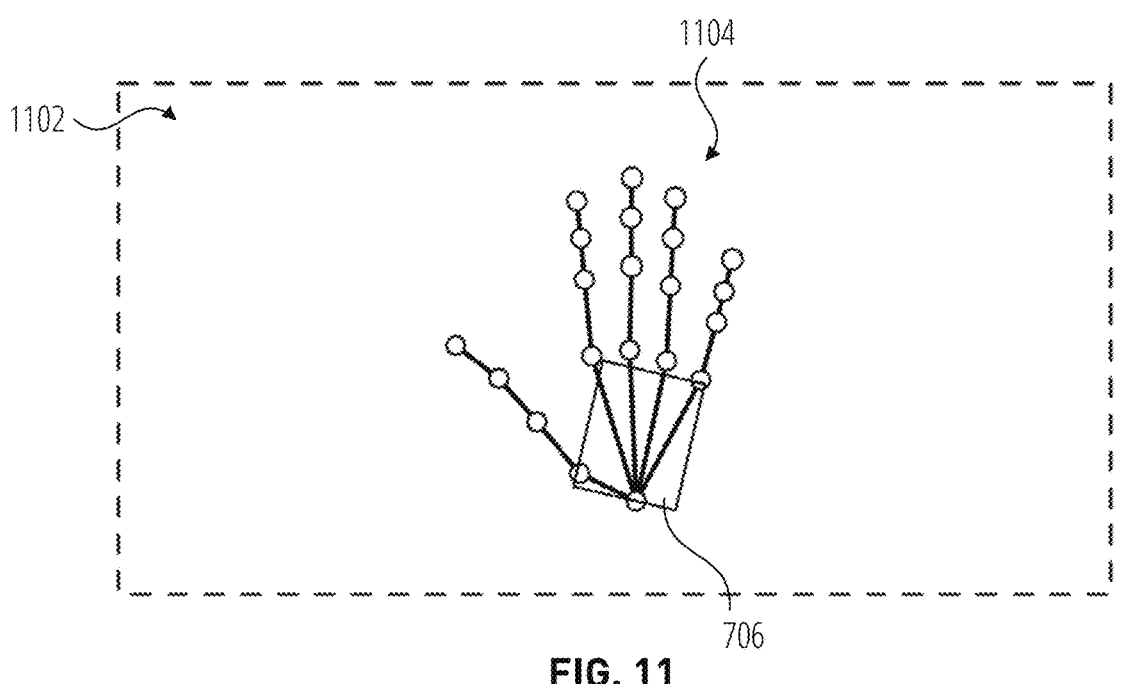
FIG. 11 illustrates a scene reconstruction as generated by an XR device at a first point in time during a user session, according to some examples, showing hand landmarks of a first hand of a user and an input plane detected by the XR device.

FIG. 11 shows the reconstruction 1102 at a first point in time. As in FIG. 7, only the first hand 704 appears in the field of view of the XR device 110 at the first point in time. Thus, the reconstruction 1102 shows a first hand representation 1104 provided by tracked landmarks for the first hand 704. The input plane 706, which is fitted to a plurality of landmarks (e.g., to a wrist landmark, an index finger joint landmark, and a pinky finger landmark of the first hand 704), is also shown in FIG. 7.

Figure 12:
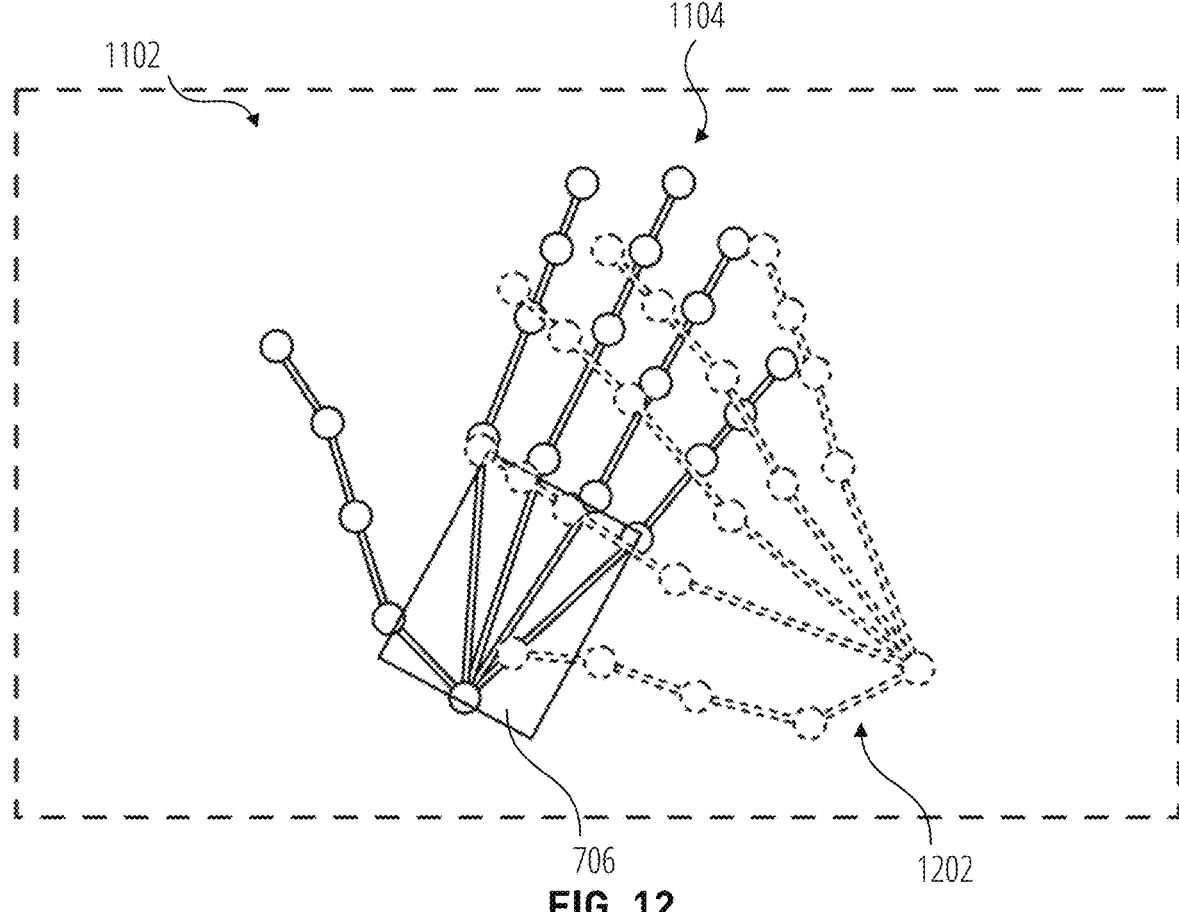
FIG. 12 illustrates a scene reconstruction generated at a second point in time during the user session of FIG. 11, according to some examples, showing hand landmarks of the first hand and of a second hand of the user, as well as the input plane.

FIG. 12 shows the reconstruction 1102 at a second point in time. As in FIG. 8, both the first hand 704 and the second hand 802 appear in the field of view of the XR device 110 at the second point in time. Thus, the reconstruction 1102 shows both the first hand representation 1104 and a second hand representation 1202, the latter provided by tracked landmarks for the second hand 802. The XR device 110 tracks the position of one or more parts of the second hand 802 as it engages with the input plane 706. For example, the second hand 802 is tracked relative to the input plane 706 in a frame-by-frame manner, with the positions of the second hand 802 and the input plane 706 being continuously tracked and updated for each frame (or periodically, e.g., every 5 frames) to improve accuracy.

Figure 13:
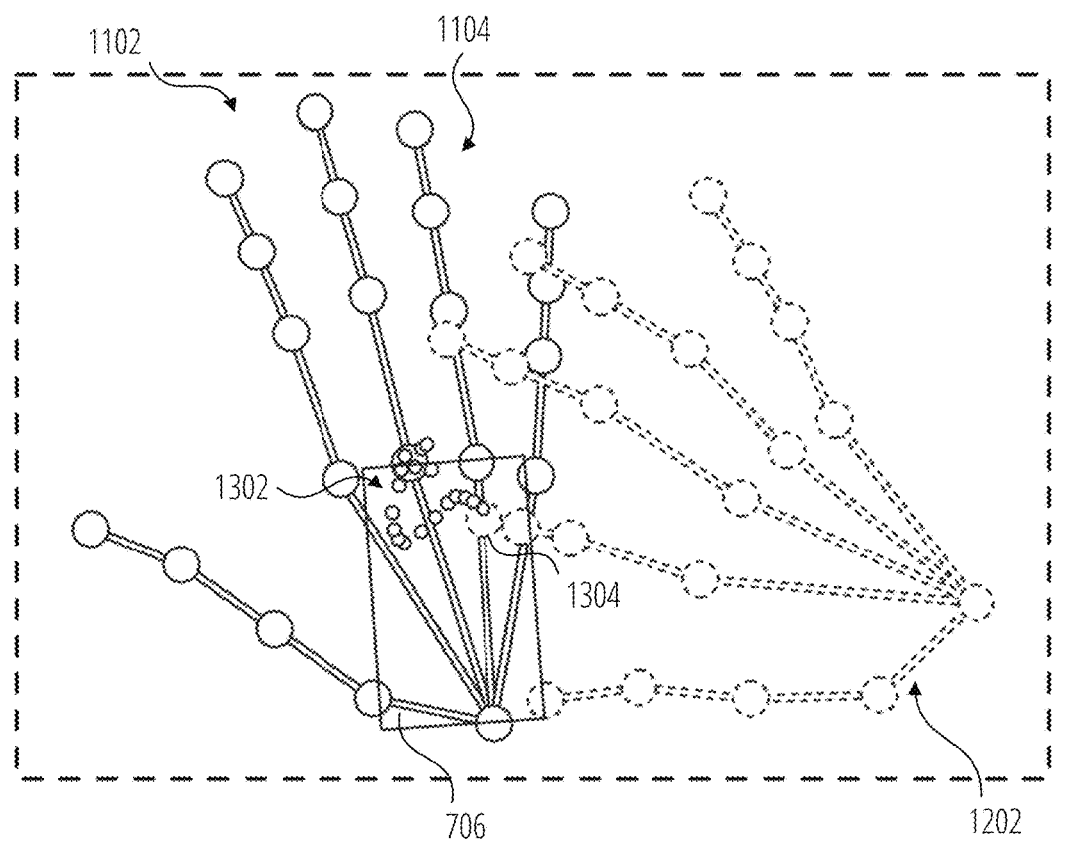
FIG. 13 illustrates a scene reconstruction generated at a third point in time during the user session of FIG. 11, according to some examples, showing hand landmarks of the first hand and the second hand, as well as the input plane, and further showing projected positions of a fingertip of a finger the second hand.

FIG. 13 shows the reconstruction 1102 at a third point in time. As in FIG. 9, user input is ongoing at this stage. The XR device 110 has tracked the position of the fingertip 1304 of the index finger of the second hand 802 across multiple image frames and projected the relevant positions onto the input plane 706. Thus, the reconstruction 1102 shows projected positions 1302 of the fingertip 1304 corresponding to the respective frames in the session.

The projected positions 1302 are generated by the XR device 110 by projecting the 3D positions of the fingertip 1304 onto the input plane 706. For example, for a particular image frame or point in time, a hand tracker of the XR device 110 (e.g., the object tracking system 222) provides the 3D position of the fingertip 1304 in the real-world environment 702 (e.g., relative to the XR device 110 or a fixed reference point), a plane estimator (e.g., the surface-based input system 226) provides the position of the input plane 706, and a suitable calculation such as a dot product operation is applied by the XR device 110 to obtain the projection.

The XR device 110 may record all projected positions, e.g., provided that a projected position corresponds to an engaged/touching state. The XR device 110 may repeat this process automatically until a user input finalization trigger is detected (e.g., an ongoing/finalized model outputs a "finalized" prediction based on the latest image frame or frames).

Figure 14:
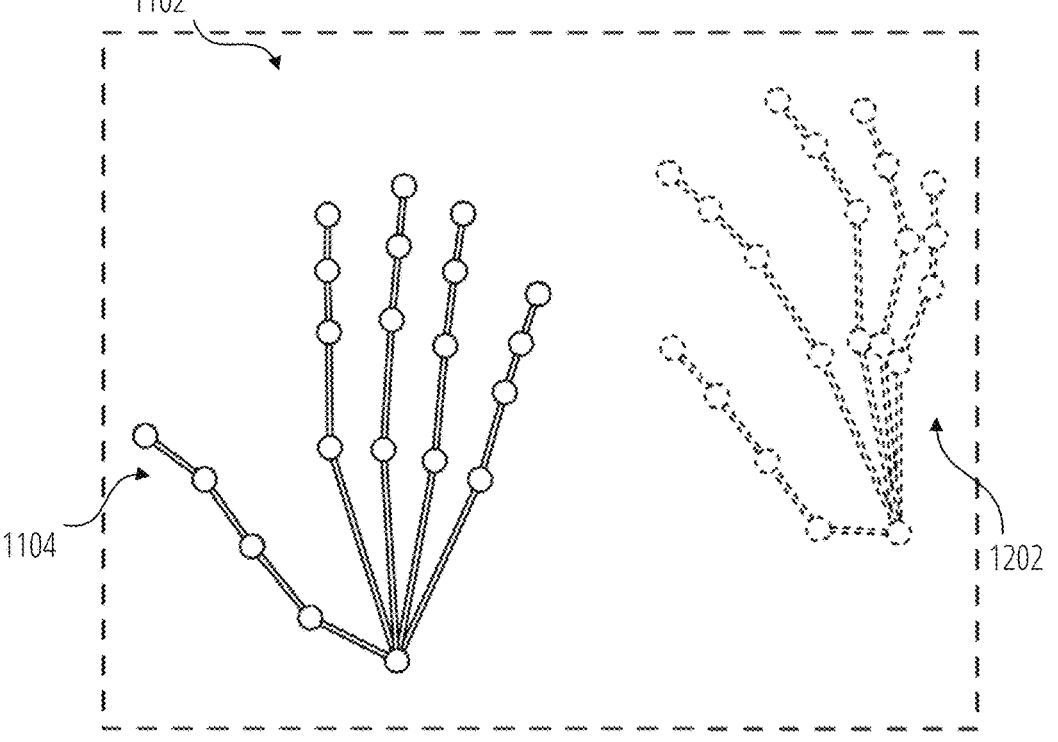
FIG. 14 illustrates a scene reconstruction generated at a fourth point in time during the user session of FIG. 11, according to some examples, showing hand landmarks of the first hand and the second hand.

FIG. 14 shows the reconstruction 1102 at a fourth point in time. As in FIG. 10, the user 106 has completed the relevant user interaction and the first hand representation 1104 is thus spaced apart from the second hand representation 1202, as shown. As explained elsewhere in the present disclosure, the XR device 110 detects that a user interaction has been completely finalized, and then processes and interprets the relevant input (e.g., the number "8") as a whole to identify its meaning or value.

Once input is finalized, the recorded projected positions are processed as a unified set of coordinates. For example, when writing a number "8," the XR device 110 maintains the spatial relationships between the points making up both the vertical and horizontal strokes while preserving their temporal sequence to properly group them as part of the same character. A neural network model for ongoing/finalized input detection may analyze the temporal patterns and spatial relationships between these recorded positions to determine when the complete input has been received.

Accordingly, the projected positions 1302 represent the relevant points where the fingertip 1304 intersects with the input plane 706, which are then processed by the XR device 110 to interpret the user input. It is noted that the XR device 110 may interpolate between positions (before or after projection) to smooth the input signal and/or to generate a more easily recognizable input signal (e.g., to create a smooth letter or number), particularly where the finger moves rapidly, resulting in a relatively scattered raw signal.

Figure 15:
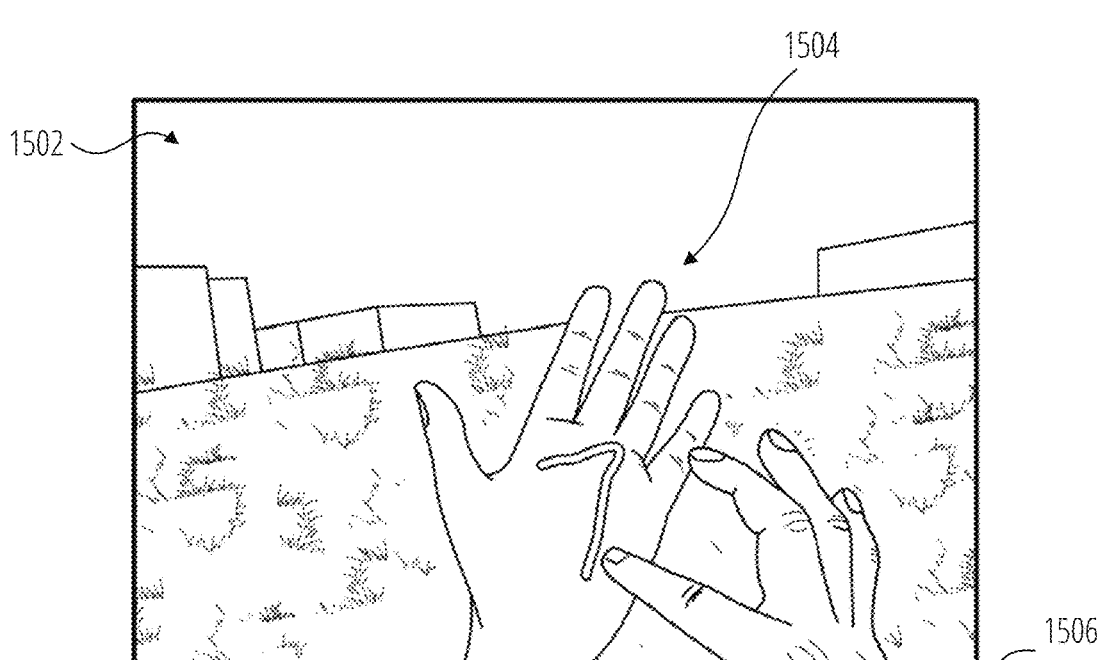
FIG. 15 is a perspective view of a real-world environment from the perspective of a user of an XR device, according to some examples, illustrating the writing of a number by the user on their own palm, as detected by the XR device.
Figure 16:
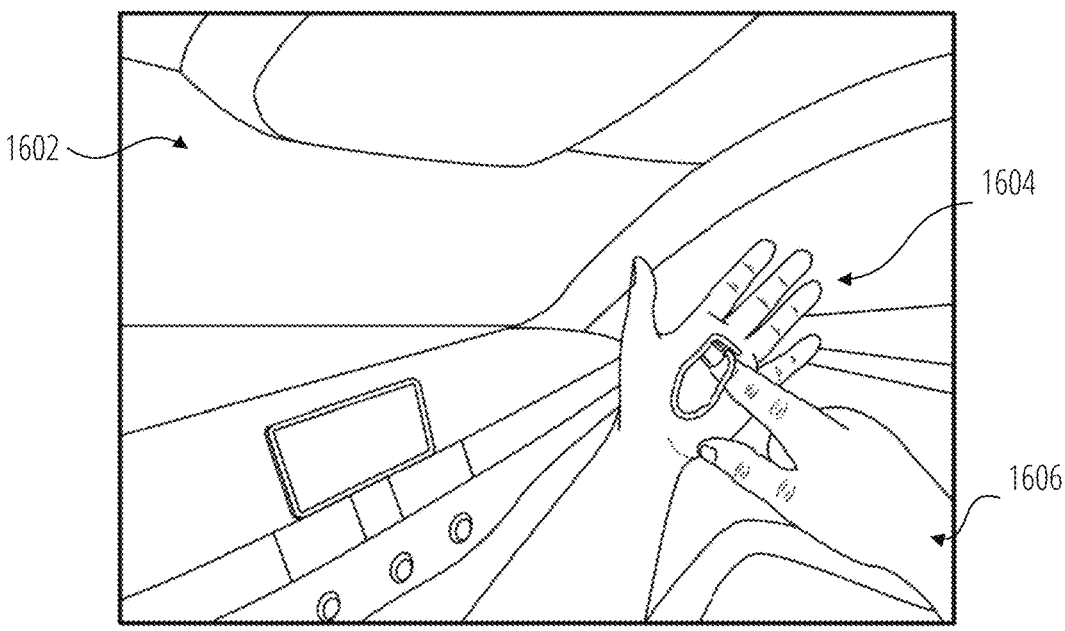
FIG. 16 is a perspective view of a real-world environment from the perspective of a user of an XR device, according to some examples, illustrating the writing of a number by the user on their own palm, as detected by the XR device.

FIG. 15 and FIG. 16 provide further examples. FIG. 15 is a perspective view of a real-world environment 1502 from the perspective of a user of an XR device, according to some examples. For example, the XR device is the XR device 110 of FIG. 1 to FIG. 3, which may be operated as a head-worn device by the user 106.

In FIG. 15, the user 106 is shown to write the number "7" on a first hand 1504 (the non-dominant hand of the user 106) using the index finger of a second hand 1506 (the dominant hand of the user 106). In some examples, the XR device 110 employs temporal context monitoring to track when a user lifts their finger from the input plane and begins a new stroke. For example, the surface-based input system 226 of the XR device 110 detects that multiple strokes are part of the same character input, such as when the user 106 writes the "7" of FIG. 15 with two strokes: the main diagonal stroke and the horizontal line. The XR device 110 distinguishes between relevant and irrelevant input signals. When the user 106 writes the "7" of FIG. 15, the surface-based input system 226 determines (e.g., using a trained neural network as described elsewhere in the present disclosure) that lifting the finger to add the horizontal line is part of the same character input rather than the start of a new character.

FIG. 16 is a perspective view of a real-world environment 1602 from the perspective of a user of an XR device, according to some examples. For example, the XR device is the XR device 110 of FIG. 1 to FIG. 3, which may be operated as a head-worn device by the user 106. In FIG. 16, the user 106 is shown to write the number "0" on a first hand 1604 (the non-dominant hand of the user 106) using the index finger of a second hand 1606 (the dominant hand of the user 106).

In the context of FIG. 16, the XR device 110 may perform rotation normalization before interpreting the user input. For example, the surface-based input system 226 detects that the first hand 1604 is rotated to a near-horizontal orientation relative to the XR device 110 or a gravity direction, and based on the assumption that the user 106 would typically regard the dorsal end of the first hand 1604 as the top end of a writing surface, automatically rotates the input prior to interpretation. This improves the likelihood of accurate processing and interpretation.

Figure 17:
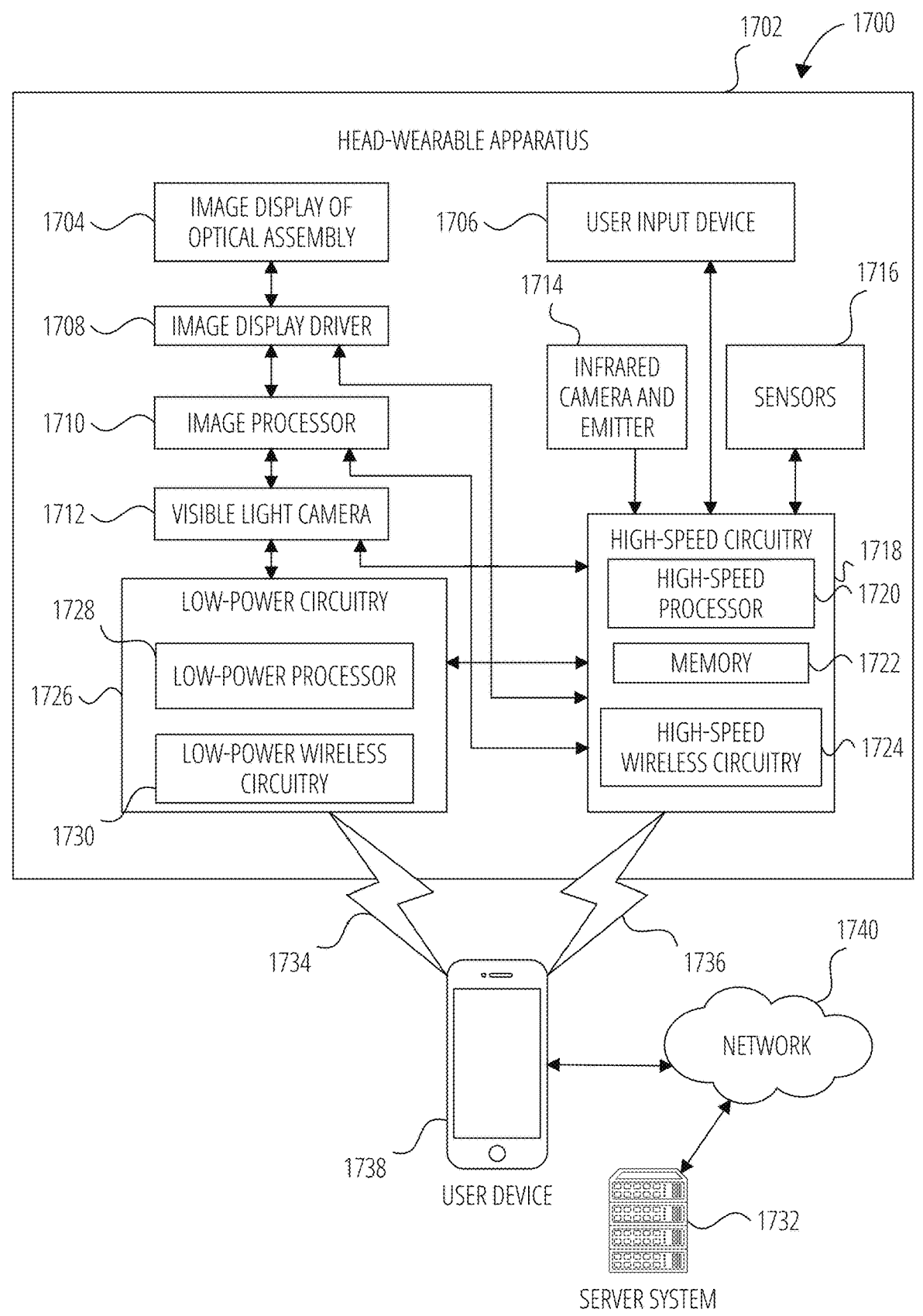
FIG. 17 illustrates a network environment in which a head-wearable apparatus can be implemented, according to some examples.

FIG. 17 illustrates a network environment 1700 in which a head-wearable apparatus 1702, such as a head-wearable extended reality (XR) device, can be implemented, according to some examples. FIG. 17 provides a high-level functional block diagram of an example head-wearable apparatus 1702 communicatively coupled a mobile user device 1738 and a server system 1732 via a suitable network 1740. One or more techniques described herein may be performed using the head-wearable apparatus 1702 or a network of devices similar to those shown in FIG. 17.

The head-wearable apparatus 1702 includes a camera, such as at least one of a visible light camera 1712 and an infrared camera and emitter 1714. The head-wearable apparatus 1702 includes other sensors 1716, such as motion sensors or eye tracking sensors. The user device 1738 can be capable of connecting with head-wearable apparatus 1702 using both a communication link 1734 and a communication link 1736. The user device 1738 is connected to the server system 1732 via the network 1740. The network 1740 may include any combination of wired and wireless connections.

The head-wearable apparatus 1702 has a display arrangement that can have several components. The arrangement can include one or more displays of image display of optical assembly 1704. For example, the displays include one associated with the left lateral side and one associated with the right lateral side of the head-wearable apparatus 1702. The head-wearable apparatus 1702 also includes an image display driver 1708, an image processor 1710, low-power circuitry 1726, and high-speed circuitry 1718. The two displays of the image display of optical assembly 1704 are for presenting images and videos, including an image that can provide a graphical user interface to a user of the head-wearable apparatus 1702.

The image display driver 1708 commands and controls the image display of the image display of optical assembly 1704. The image display driver 1708 may deliver image data directly to each image display of the image display of optical assembly 1704 for presentation or may have to convert the image data into a signal or data format suitable for delivery to each image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The head-wearable apparatus 1702 may include a frame and stems (or temples) extending from a lateral side of the frame, or another component to facilitate wearing of the head-wearable apparatus 1702 by a user. The head-wearable apparatus 1702 of FIG. 17 further includes a user input device 1706 (e.g., touch sensor or push button) including an input surface on the head-wearable apparatus 1702. The user input device 1706 is configured to receive, from the user, an input selection to manipulate the graphical user interface of the presented image.

The components shown in FIG. 17 for the head-wearable apparatus 1702 are located on one or more circuit boards, for example a printed circuit board (PCB) or flexible PCB, in the rims or temples. Alternatively, or additionally, the depicted components can be located in the chunks, frames, hinges, or bridges of the head-wearable apparatus 1702. Left and right sides of the head-wearable apparatus 1702 can each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1702 includes a memory 1722 which stores instructions to perform a subset of, or all, of the functions of the head-wearable apparatus 1702. The memory 1722 can also include a storage device. As further shown in FIG. 17, the high-speed circuitry 1718 includes a high-speed processor 1720, the memory 1722, and high-speed wireless circuitry 1724. In FIG. 17, the image display driver 1708 is coupled to the high-speed circuitry 1718 and operated by the high-speed processor 1720 to drive the left and right image displays of the image display of optical assembly 1704. The high-speed processor 1720 may be any processor capable of managing high-speed communications and operation of any general computing system needed for the head-wearable apparatus 1702. The high-speed processor 1720 includes processing resources needed for managing high-speed data transfers over the communication link 1736 to a wireless local area network (WLAN) using high-speed wireless circuitry 1724. n certain examples, the high-speed processor 1720 executes an operating system such as a LINUX operating system or other such operating system of the head-wearable apparatus 1702 and the operating system is stored in memory 1722 for execution. In addition to any other responsibilities, the high-speed processor 1720 executing a software architecture for the head-wearable apparatus 1702 is used to manage data transfers with high-speed wireless circuitry 1724. In certain examples, high-speed wireless circuitry 1724 is configured to implement Institute of Electrical and Electronic Engineers (IEEE) 1702.11 communication standards, also referred to herein as Wi-Fi. In other examples, other high-speed communications standards may be implemented by high-speed wireless circuitry 1724.

The low-power wireless circuitry 1730 and the high-speed wireless circuitry 1724 of the head-wearable apparatus 1702 can include short range transceivers (Bluetooth™ Bluetooth Low Energy (LE), Zigbee, or ANT+) and wireless wide, local, or wide area network transceivers (e.g., cellular or Wi-Fi). The user device 1738, including the transceivers communicating via the communication link 1734 and communication link 1736, may be implemented using details of the architecture of the head-wearable apparatus 1702, as can other elements of the network 1740.

The memory 1722 includes any storage device capable of storing various data and applications, including, among other things, camera data generated by the visible light camera 1712, sensors 1716, and/or the image processor 1710, as well as images generated for display by the image display driver 1708 on the image displays of the image display of optical assembly 1704. While the memory 1722 is shown as integrated with the high-speed circuitry 1718, in other examples, the memory 1722 may be an independent standalone element of the head-wearable apparatus 1702. In certain such examples, electrical routing lines may provide a connection through a chip that includes the high-speed processor 1720 from the image processor 1710 or low-power processor 1728 to the memory 1722. In other examples, the high-speed processor 1720 may manage addressing of memory 1722 such that the low-power processor 1728 will boot the high-speed processor 1720 any time that a read or write operation involving memory 1722 is needed.

As shown in FIG. 17, the low-power processor 1728 or high-speed processor 1720 of the head-wearable apparatus 1702 can be coupled to the camera (visible light camera 1712, or infrared camera and emitter 1714), the image display driver 1708, the user input device 1706 (e.g., touch sensor or push button), and the memory 1722. The head-wearable apparatus 1702 also includes sensors 1716, which may be the motion components, position components, environmental components, and/or biometric components. In particular, motion components and position components are used by the head-wearable apparatus 1702 to determine and keep track of the position and orientation (the "pose") of the head-wearable apparatus 1702 relative to a frame of reference or another object, in conjunction with a video feed from one of the visible light cameras 1712, using, for example, techniques such as structure from motion (SfM) or Visual Inertial Odometry (VIO).

In some examples, and as shown in FIG. 17, the head-wearable apparatus 1702 is connected with a host computer. For example, the head-wearable apparatus 1702 is paired with the user device 1738 via the communication link 1736 or connected to the server system 1732 via the network 1740. The server system 1732 may be one or more computing devices as part of a service or network computing system, for example, that include a processor, a memory, and network communication interface to communicate over the network 1740 with the user device 1738 and head-wearable apparatus 1702.

The user device 1738 includes a processor and a network communication interface coupled to the processor. The network communication interface allows for communication over the network 1740, communication link 1734 or communication link 1736. The user device 1738 can further store at least portions of the instructions to implement the functionality described herein.

Output components of the head-wearable apparatus 1702 include visual components, such as a display (e.g., one or more liquid-crystal display (LCD)), one or more plasma display panel (PDP), one or more light emitting diode (LED) display, one or more projector, or one or more waveguide. In some examples, the image displays of the optical assembly are driven by the image display driver 1708. The output components of the head-wearable apparatus 1702 further include acoustic components (e.g., speakers), haptic components (e.g., a vibratory motor), other signal generators, and so forth. The input components of the head-wearable apparatus 1702, the user device 1738, and server system 1732, such as the user input device 1706, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1702 may optionally include additional peripheral device elements. Such peripheral device elements may include sensors or display elements integrated with the head-wearable apparatus 1702. For example, peripheral device elements may include any I/O components including output components, motion components, position components, or any other such elements described herein.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 1736 from the user device 1738 via the low-power wireless circuitry 1730 or high-speed wireless circuitry 1724.

Figure 18:
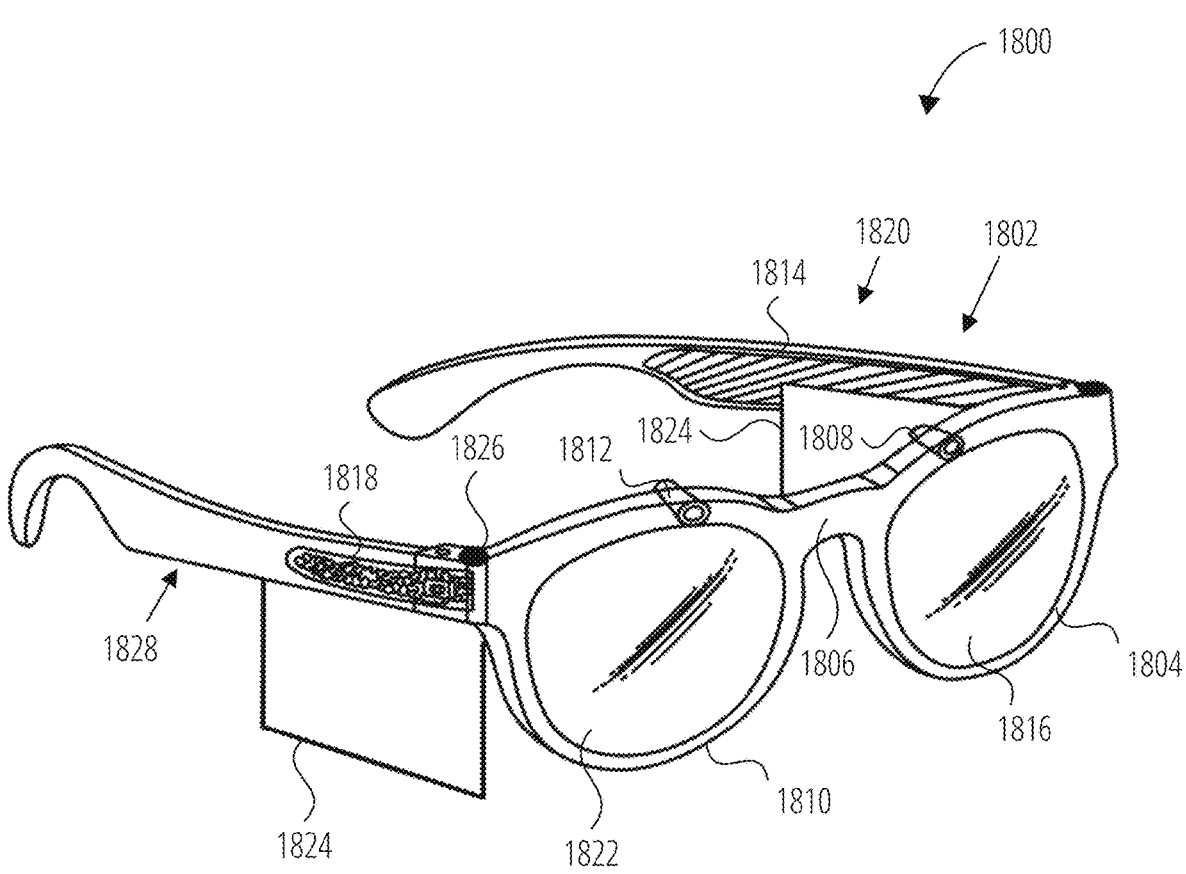
FIG. 18 is a perspective view of a head-worn device, according to some examples.

FIG. 18 is a perspective view of a head-worn AR device in the form of glasses 1800, in accordance with some examples. The glasses 1800 can include a frame 1802 made from any suitable material such as plastic or metal, including any suitable shape memory alloy. In one or more examples, the frame 1802 includes a first or left optical element holder 1804 (e.g., a display or lens holder) and a second or right optical element holder 1810 connected by a bridge 1806. A first or left optical element 1816 and a second or right optical element 1822 can be provided within respective left optical element holder 1804 and right optical element holder 1810. The right optical element 1822 and the left optical element 1816 can be a lens, a display, a display assembly, or a combination of the foregoing. Any suitable display assembly can be provided in the glasses 1800.

The frame 1802 additionally includes a left arm or temple piece 1820 and a right arm or temple piece 1828. In some examples, the frame 1802 can be formed from a single piece of material so as to have a unitary or integral construction.

The glasses 1800 can include a computing device, such as a computer 1818, which can be of any suitable type so as to be carried by the frame 1802 and, in some examples, of a suitable size and shape, so as to be partially disposed in one of the temple piece 1820 or the temple piece 1828. The computer 1818 can include one or more processors with memory, wireless communication circuitry, and a power source. As discussed, the computer 1818 may comprise low-power circuitry, high-speed circuitry, and a display processor. Various other examples may include these elements in different configurations or integrated together in different ways. Additional details of aspects of the computer 1818 may be implemented as illustrated by the head-wearable apparatus 1702 discussed above.

The computer 1818 additionally includes a battery 1814 or other suitable portable power supply. In some examples, the battery 1814 is disposed in left temple piece 1820 and is electrically coupled to the computer 1818 disposed in the right temple piece 1828. The glasses 1800 can include a connector or port (not shown) suitable for charging the battery 1814 a wireless receiver, transmitter or transceiver (not shown), or a combination of such devices.

The glasses 1800 include a first or left camera 1808 and a second or right camera 1812. Although two cameras are depicted, other examples contemplate the use of a single or additional (i.e., more than two) cameras. In some examples, the glasses 1800 include any number of input sensors or other input/output devices in addition to the left camera 1808 and the right camera 1812. Such sensors or input/output devices can additionally include biometric sensors, location sensors, motion sensors, and so forth. In some examples, the left camera 1808 and the right camera 1812 provide video frame data for use by the glasses 1800 to extract 3D information from a real-world scene, to track objects, to determine, for instance, relative positions between objects.

The glasses 1800 may also include a touchpad 1824 mounted to or integrated with one or both of the left temple piece 1820 and right temple piece 1828. The touchpad 1824 is generally vertically-arranged, approximately parallel to a user's temple in some examples. As used herein, generally vertically aligned means that the touchpad is more vertical than horizontal, although potentially more vertical than that. Additional user input may be provided by one or more buttons 1826, which in the illustrated examples are provided on the outer upper edges of the left optical element holder 1804 and right optical element holder 1810. The one or more touchpads 1824 and buttons 1826 provide a means whereby the glasses 1800 can receive input from a user of the glasses 1800.

Figure 19:
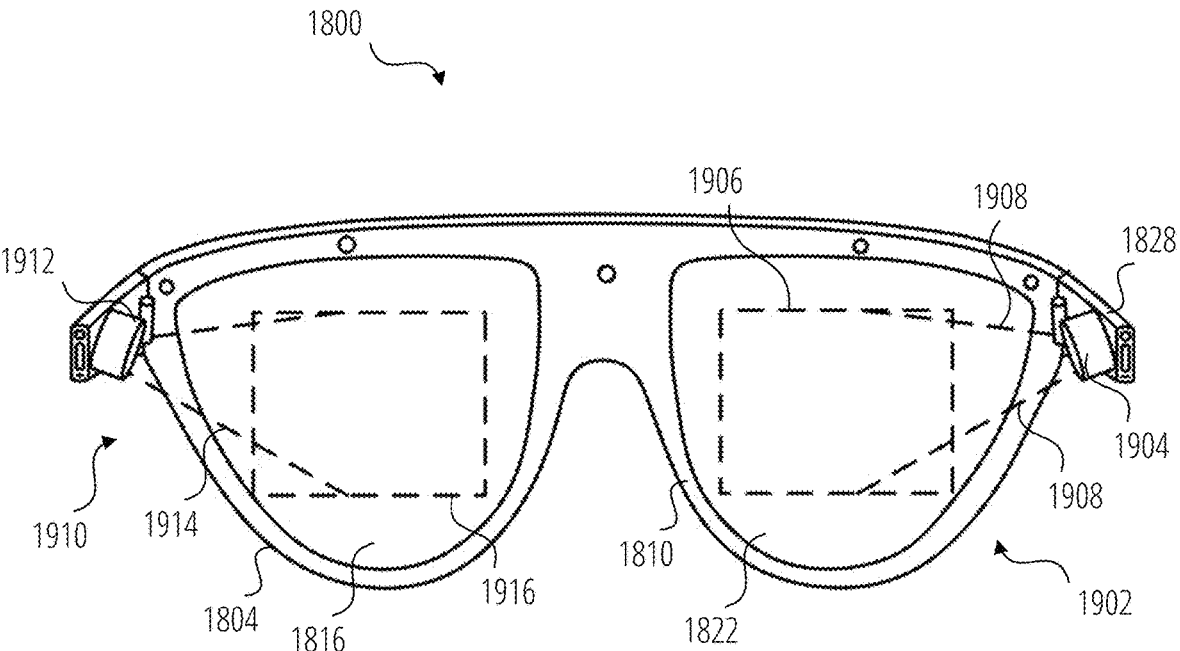
FIG. 19 illustrates a further view of the head-worn device of FIG. 18, showing the device from the perspective of a user, according to some examples.

FIG. 19 illustrates the glasses 1800 from the perspective of a user. For clarity, a number of the elements shown in FIG. 18 have been omitted. As described with reference to FIG. 18, the glasses 1800 include left optical element 1816 and right optical element 1822 secured within the left optical element holder 1804 and the right optical element holder 1810 respectively.

The glasses 1800 include forward optical assembly 1902 comprising a right projector 1904 and a right near eye display 1906, and a forward optical assembly 1910 including a left projector 1912 and a left near eye display 1916. In some examples, the near eye displays are waveguides. The waveguides include reflective or diffractive structures (e.g., gratings and/or optical elements such as mirrors, lenses, or prisms). Light 1908 emitted by the projector 1904 encounters the diffractive structures of the waveguide of the near eye display 1906, which directs the light towards the right eye of a user to provide an image on or in the right optical element 1822 that overlays the view of the real world seen by the user. Similarly, light 1914 emitted by the projector 1912 encounters the diffractive structures of the waveguide of the near eye display 1916, which directs the light towards the left eye of a user to provide an image on or in the left optical element 1816 that overlays the view of the real world seen by the user.

In some examples, the combination of a GPU, the forward optical assembly 1902, the forward optical assembly 1910, the left optical element 1816, and the right optical element 1822 may provide an optical engine of the glasses 1800. The glasses 1800 use the optical engine to generate an overlay of the real-world view of the user including display of a 3D user interface to the user of the glasses 1800.

It will be appreciated however that other display technologies or configurations may be utilized within an optical engine to display an image to a user in the user's field of view. For example, instead of a projector 1904 and a waveguide, an LCD, LED or other display panel or surface may be provided.

In use, a user of the glasses 1800 will be presented with information, content and various 3D user interfaces on the near eye displays. As described in more detail elsewhere herein, the user can then interact with a device such as the glasses 1800 using a touchpad 1824 and/or the buttons 1826, voice inputs or touch inputs on an associated device (e.g., the user device 1738 shown in FIG. 17), and/or hand movements, locations, and positions detected by the glasses 1800.

Figure 20:
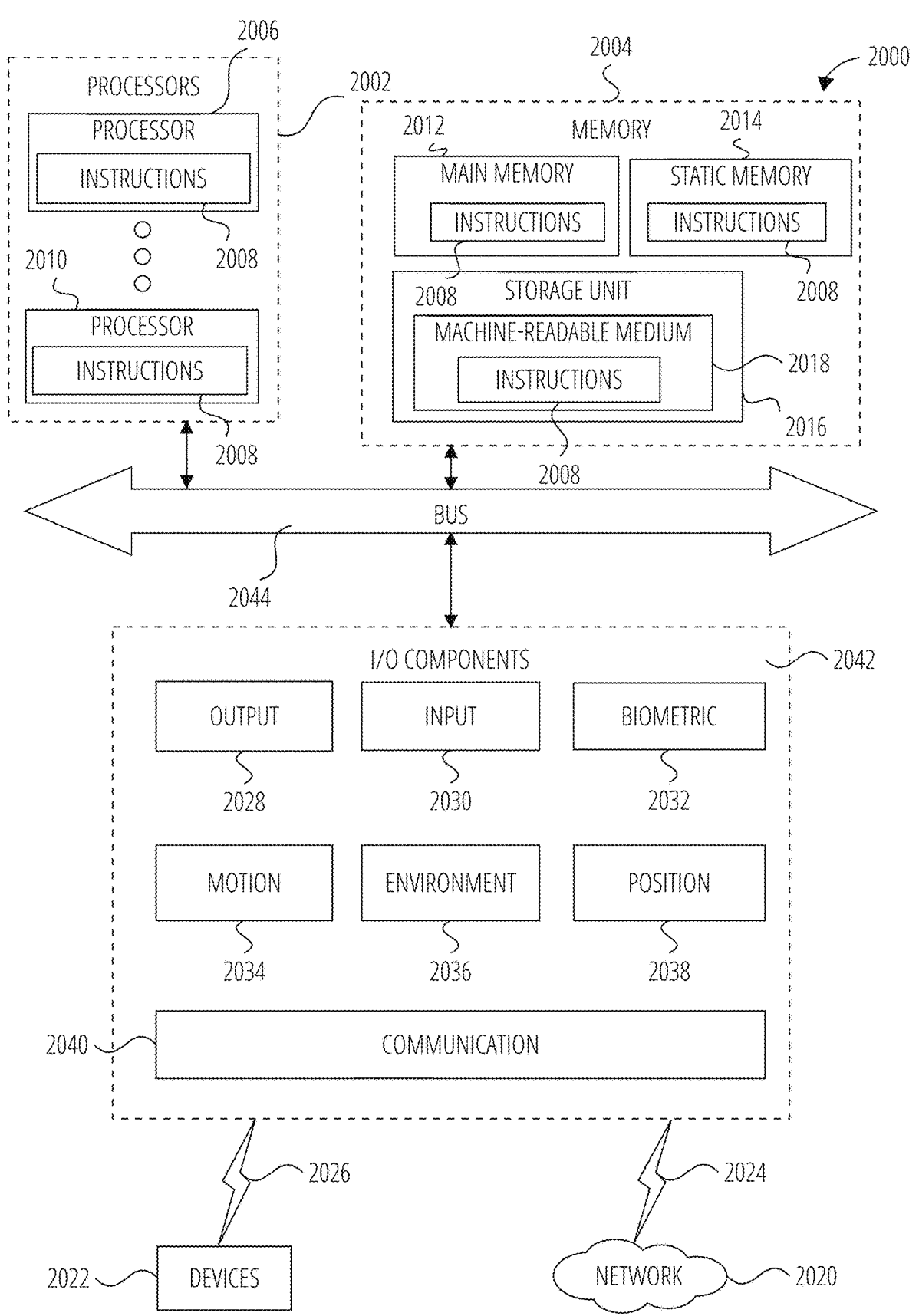
FIG. 20 is a diagrammatic representation of a machine in the form of a computer system within which a set of instructions may be executed for causing the machine to perform any one or more of the methodologies discussed herein, according to some examples.

FIG. 20 is a diagrammatic representation of a machine 2000 within which instructions 2008 (e.g., software, a program, an application, an applet, an app, or other executable code) for causing the machine 2000 to perform one or more of the methodologies discussed herein may be executed. For example, the instructions 2008 may cause the machine 2000 to execute any one or more of the methods described herein. The instructions 2008 transform the general, non-programmed machine 2000 into a particular machine 2000 programmed to carry out the described and illustrated functions in the manner described. The machine 2000 may operate as a standalone device or may be coupled (e.g., networked) to other machines. In a networked deployment, the machine 2000 may operate in the capacity of a server machine or a client machine in a server-client network environment, or as a peer machine in a peer-to-peer (or distributed) network environment. The machine 2000 may comprise, but not be limited to, a server computer, a client computer, a personal computer (PC), a tablet computer, a laptop computer, a netbook, an entertainment media system, a cellular telephone, a smart phone, a mobile device, a wearable device (e.g., a smart watch), XR device, a smart home device (e.g., a smart appliance), other smart devices, a web appliance, a network router, a network switch, a network bridge, or any machine capable of executing the instructions 2008, sequentially or otherwise, that specify actions to be taken by the machine 2000. Further, while only a single machine 2000 is illustrated, the term "machine" shall also be taken to include a collection of machines that individually or jointly execute the instructions 2008 to perform any one or more of the methodologies discussed herein.

The machine 2000 may include processors 2002, memory 2004, and I/O components 2042, which may be configured to communicate with each other via a bus 2044. In some examples, the processors 2002 may include, for example, a processor 2006 and a processor 2010 that execute the instructions 2008. Although FIG. 20 shows multiple processors 2002, the machine 2000 may include a single processor with a single core, a single processor with multiple cores (e.g., a multi-core processor), multiple processors with a single core, multiple processors with multiples cores, or any combination thereof.

The memory 2004 includes a main memory 2012, a static memory 2014, and a storage unit 2016, accessible to the processors via the bus 2044. The main memory 2004, the static memory 2014, and storage unit 2016 store the instructions 2008 embodying any one or more of the methodologies or functions described herein. The instructions 2008 may also reside, completely or partially, within the main memory 2012, within the static memory 2014, within machine-readable medium 2018 within the storage unit 2016, within at least one of the processors, or any suitable combination thereof, during execution thereof by the machine 2000.

The I/O components 2042 may include a wide variety of components to receive input, provide output, produce output, transmit information, exchange information, capture measurements, and so on. The specific I/O components 2042 that are included in a particular machine will depend on the type of machine. For example, portable machines such as mobile phones may include a touch input device or other such input mechanisms, while a headless server machine will likely not include such a touch input device. It will be appreciated that the I/O components 2042 may include many other components that are not shown in FIG. 20. In various examples, the I/O components 2042 may include output components 2028 and input components 2030. The output components 2028 may include visual components (e.g., a display such as a plasma display panel (PDP), a light emitting diode (LED) display, a LCD, a projector, or a cathode ray tube (CRT)), acoustic components (e.g., speakers), haptic components (e.g., a vibratory motor, resistance mechanisms), other signal generators, and so forth. The input components 2030 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 2042 may include biometric components 2032, motion components 2034, environmental components 2036, or position components 2038, among a wide array of other components. For example, the biometric components 2032 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2034 include acceleration sensor components (e.g., accelerometer), gravitation sensor components, rotation sensor components (e.g., gyroscope), and so forth. The environmental components 2036 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2038 include location sensor components (e.g., a GPS receiver components), altitude sensor components (e.g., altimeters or barometers that detect air pressure from which altitude may be derived), orientation sensor components (e.g., magnetometers), and the like.

Any biometric data collected by biometric components is captured and stored with only user approval and deleted on user request. Further, such biometric data is used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 2042 further include communication components 2040 operable to couple the machine 2000 to a network 2020 or devices 2022 via a coupling 2024 and a coupling 2026, respectively. For example, the communication components 2040 may include a network interface component or another suitable device to interface with the network 2020. In further examples, the communication components 2040 may include wired communication components, wireless communication components, cellular communication components, Near Field Communication (NFC) components, Bluetooth™ components, Wi-Fi™ components, and other communication components to provide communication via other modalities. The devices 2022 may be another machine or any of a wide variety of peripheral devices (e.g., a peripheral device coupled via a USB).

Moreover, the communication components 2040 may detect identifiers or include components operable to detect identifiers. For example, the communication components 2040 may include Radio Frequency Identification (RFID) tag reader components, NFC smart tag detection components, optical reader components (e.g., an image sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2040, such as location via Internet Protocol (IP) geolocation, location via Wi-Fi™ signal triangulation, location via detecting an NFC beacon signal that may indicate a particular location, and so forth.

The various memories (e.g., memory 2004, main memory 2012, static memory 2014, and/or memory of the processors 2002) and/or storage unit 2016 may store one or more sets of instructions and data structures (e.g., software) embodying or used by any one or more of the methodologies or functions described herein. These instructions (e.g., the instructions 2008), when executed by processors 2002, cause various operations to implement the disclosed examples.

The instructions 2008 may be transmitted or received over the network 2020, using a transmission medium, via a network interface device (e.g., a network interface component included in the communication components 2040) and using any one of a number of well-known transfer protocols (e.g., hypertext transfer protocol (HTTP)). Similarly, the instructions 2008 may be transmitted or received using a transmission medium via the coupling 2026 (e.g., a peer-to-peer coupling) to the devices 2022.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the
instructions for execution by the machine 2000, and include
digital or analog communications signals or other intangible
media to facilitate communication of such software. Hence,
the terms "transmission medium" and "signal medium" shall
be taken to include any form of modulated data signal,
carrier wave, and so forth. The term "modulated data signal"
means a signal that has one or more of its characteristics set
or changed in such a manner as to encode information in the
signal.

<center>CONCLUSION</center>

Although aspects have been described with reference to
specific examples, it will be evident that various modifica-
tions and changes may be made to these examples without
departing from the broader scope of the present disclosure.
Accordingly, the specification and drawings are to be
regarded in an illustrative rather than a restrictive sense. The
accompanying drawings that form a part hereof, show by
way of illustration, and not of limitation, specific examples
in which the subject matter may be practiced. The examples
illustrated are described in sufficient detail to enable those
skilled in the art to practice the teachings disclosed herein.
Other examples may be utilized and derived therefrom, such
that structural and logical substitutions and changes may be
made without departing from the scope of this disclosure.
This Detailed Description, therefore, is not to be taken in a
limiting sense, and the scope of various examples is defined
only by the appended claims, along with the full range of
equivalents to which such claims are entitled.

As used in this disclosure, phrases of the form "at least
one of an A, a B, or a C," "at least one of A, B, or C," "at
least one of A, B, and C," and the like, should be interpreted
to select at least one from the group that comprises "A, B,
and C." Unless explicitly stated otherwise in connection
with a particular instance in this disclosure, this manner of
phrasing does not mean "at least one of A, at least one of B,
and at least one of C." As used in this disclosure, the
example "at least one of an A, a B, or a C," would cover any
of the following selections: {A}, {B}, {C}, {A, B}, {A, C},
{B, C}, and {A, B, C}.

As used herein, a "processor" may include any one or
more circuits or virtual circuits (e.g., a physical circuit
emulated by logic executing on an actual processor) that
manipulates data values according to control signals (e.g.,
commands, opcodes, machine code, control words, macro-
instructions, etc.) and which produces corresponding output
signals that are applied to operate a machine. A processor
may, for example, include at least one of a Central Process-
ing Unit (CPU), a Reduced Instruction Set Computing
(RISC) Processor, a Complex Instruction Set Computing
(CISC) Processor, a Graphics Processing Unit (GPU), a
Digital Signal Processor (DSP), a Tensor Processing Unit
(TPU), a Neural Processing Unit (NPU), a Vision Processing
Unit (VPU), a Machine Learning Accelerator, an Artificial
Intelligence Accelerator, an Application Specific Integrated
Circuit (ASIC), an FPGA, a Radio-Frequency Integrated
Circuit (RFIC), a Neuromorphic Processor, a Quantum
Processor, or any combination thereof. A processor may be
a multi-core processor having two or more independent
processors (sometimes referred to as "cores") that may
execute instructions contemporaneously. Multi-core proces-
sors may contain multiple computational cores on a single
integrated circuit die, each of which can independently
execute program instructions in parallel. Parallel processing
on multi-core processors may be implemented via architectures like superscalar, Very Long Instruction Word (VLIW),
vector processing, or Single Instruction, Multiple Data
(SIMD) that allow each core to run separate instruction
streams concurrently. A processor may be emulated in
software, running on a physical processor, as a virtual
processor or virtual circuit. The virtual processor may
behave like an independent processor but is implemented in
software rather than hardware.

Unless the context clearly requires otherwise, throughout
the description and the claims, the words "comprise," "com-
prising," and the like are to be construed in an inclusive
sense, as opposed to an exclusive or exhaustive sense, e.g.,
in the sense of "including, but not limited to." As used
herein, the terms "connected," "coupled," or any variant
thereof means any connection or coupling, either direct or
indirect, between two or more elements; the coupling or
connection between the elements can be physical, logical, or
a combination thereof. Additionally, the words "herein,"
"above," "below," and words of similar import, when used
in this application, refer to this application as a whole and
not to any particular portions of this application. Where the
context permits, words using the singular or plural number
may also include the plural or singular number respectively.
The word "or" in reference to a list of two or more items,
covers all of the following interpretations of the word: any
one of the items in the list, all of the items in the list, and any
combination of the items in the list. Likewise, the term
"and/or" in reference to a list of two or more items, covers
all of the following interpretations of the word: any one of
the items in the list, all of the items in the list, and any
combination of the items in the list.

The various features, steps, operations, and processes
described herein may be used independently of one another,
or may be combined in various ways. All possible combi-
nations and subcombinations are intended to fall within the
scope of this disclosure. In addition, certain method or
process blocks or operations may be omitted in some
implementations.

Although some examples, e.g., those depicted in the
drawings, include a particular sequence of operations, the
sequence may be altered without departing from the scope of
the present disclosure. For example, some of the operations
depicted may be performed in parallel or in a different
sequence that does not materially affect the functions as
described in the examples. In other examples, different
components of an example device or system that implements
an example method may perform functions at substantially
the same time or in a specific sequence.

<center>EXAMPLES</center>

In view of the above-described implementations of sub-
ject matter this application discloses the following list of
examples, wherein one feature of an example in isolation, or
more than one feature of an example taken in combination,
and, optionally, in combination with one or more features of
one or more further examples, are further examples also
falling within the disclosure of this application.

Example 1 is a method performed by an XR device, the
method comprising: tracking a hand of a user across mul-
tiple image frames captured by the XR device to obtain
positions of one or more parts of the hand in a real-world
environment; detecting an input plane associated with a
physical surface in the real-world environment; projecting
the positions onto the input plane; monitoring an input state
with respect to the input plane to: identify when the user is
providing user input via the input plane, and differentiate between ongoing user input and finalized user input; recording, based on the monitoring of the input state, one or more of the projected positions as input data; processing the input data to interpret the user input; and executing an action based on the interpreted user input.

In Example 2, the subject matter of Example 1 includes, wherein the one or more of the projected positions comprise multiple projected positions, the recording of the one or more of the projected positions comprising: while the input state indicates that the user input is ongoing, recording the multiple projected positions as the user input for a single user interaction; detecting a transition in the input state indicating that the user input is finalized; and in response to detecting the transition, consolidating the multiple projected positions recorded for the single user interaction for unified interpretation.

In Example 3, the subject matter of Example 2 includes, wherein the monitoring of the input state further comprises: at a first point in time, detecting commencement of the single user interaction; in response to detecting the commencement of the single user interaction, updating the input state to indicate that the user input is ongoing; at a second point in time, detecting ending of the single user interaction; and in response to detecting the ending of the single user interaction, updating the input state to indicate that the user input is finalized.

In Example 4, the subject matter of any of Examples 1-3 includes, wherein the monitoring of the input state comprises: processing at least a subset of the multiple image frames to detect engagement of the one or more parts of the hand with the input plane.

In Example 5, the subject matter of Example 4 includes, wherein the one or more parts of the hand comprise a fingertip of a finger of the hand, the XR device tracking the fingertip across the multiple image frames.

In Example 6, the subject matter of any of Examples 1-5 includes, wherein the one or more parts of the hand comprise at least one finger, and the user provides the user input by using the at least one finger to write or draw on the physical surface in the real-world environment.

In Example 7, the subject matter of Example 6 includes, wherein the processing of the input data comprises detecting what the user has written or drawn by performing at least one of optical character recognition (OCR) or image classification.

In Example 8, the subject matter of any of Examples 1-7 includes, wherein the tracking of the hand causes generation of three-dimensional position data, and the projecting of the positions onto the input plane comprises converting the three-dimensional position data to two-dimensional position data in an input plane space defined by the input plane.

In Example 9, the subject matter of any of Examples 1-8 includes, generating a three-dimensional reconstruction of the real-world environment, the three-dimensional reconstruction being analyzed to detect the input plane.

In Example 10, the subject matter of Example 9 includes, wherein the detecting of the input plane comprises: identifying, using the three-dimensional reconstruction, a plurality of potential input planes in the real-world environment; calculating projection errors associated with each of the plurality of potential input planes; and selecting, from among the plurality of potential input planes, the input plane based on determining that the input plane minimizes one or more of the projection errors.

In Example 11, the subject matter of any of Examples 1-10 includes, wherein the hand is a first hand of the user, and the physical surface comprises a surface on a second hand of the user, the input plane being detected by fitting the input plane to the surface on the second hand.

In Example 12, the subject matter of Example 11 includes, the method further comprising: tracking the second hand of the user to obtain a plurality of landmark positions for the second hand, the input plane being detected by fitting the input plane to the plurality of landmark positions (e.g., so as to represent a palmar surface or dorsal surface of the second hand).

In Example 13, the subject matter of any of Examples 11-12 includes, wherein the tracking of the first hand comprises tracking at least one fingertip of the first hand used by the user to provide the user input.

In Example 14, the subject matter of any of Examples 1-13 includes, wherein the input plane moves relative to the XR device while the user provides the user input, the method further comprising: continuously tracking both a plane position of the input plane relative to the XR device and a hand position of the hand relative to the XR device.

In Example 15, the subject matter of Example 14 includes, for each particular image frame of the multiple image frames: updating the plane position and the hand position; and using the updated plane position and the updated hand position to generate at least one of the one or more projected positions for a point in time associated with the particular image frame.

In Example 16, the subject matter of any of Examples 1-15 includes, prior to interpreting the user input, performing interpolation to smooth the input data.

In Example 17, the subject matter of any of Examples 1-16 includes, prior to interpreting the user input, updating the input data by performing rotation normalization.

In Example 18, the subject matter of any of Examples 1-17 includes, tracking the plurality of landmark positions across the multiple image frames; applying temporal smoothing to dynamically update the input plane based on the tracking of the plurality of landmark positions across the multiple image frames.

Example 19 is an XR device comprising: at least one processor; and at least one memory storing instructions that, when executed by the at least one processor, configure the XR device to perform operations comprising: tracking a hand of a user across multiple image frames captured by the XR device to obtain positions of one or more parts of the hand in a real-world environment; detecting an input plane associated with a physical surface in the real-world environment; continuously projecting the positions onto the input plane; continuously monitoring an input state with respect to the input plane to: identify when the user is providing user input via the input plane, and differentiate between ongoing user input and finalized user input; recording, based on the monitoring of the input state, one or more of the projected positions as input data; processing the input data to interpret the user input; and executing an action based on the interpreted user input.

Example 20 is one or more non-transitory computer-readable storage media, the one or more non-transitory computer-readable storage media including instructions that when executed by at least one processor of an XR device cause the XR device to perform operations comprising: tracking a hand of a user across multiple image frames captured by the XR device to obtain positions of one or more parts of the hand in a real-world environment; detecting an input plane associated with a physical surface in the real-world environment; projecting the positions onto the input plane; monitoring an input state with respect to the input plane to: identify when the user is providing user input via the input plane, and differentiate between ongoing user input and finalized user input; recording, based on the monitoring of the input state, one or more of the projected positions as input data; processing the input data to interpret the user input; and executing an action based on the interpreted user input.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

What is claimed is:

1. A method performed by an extended reality (XR) device, the method comprising:
   generating a three-dimensional reconstruction of a real-world environment;
   tracking a hand of a user across multiple image frames captured by the XR device to obtain positions of one or more parts of the hand in the real-world environment;
   identifying a plurality of potential input lanes in the real-world environment using the three-dimensional reconstruction;
   calculating projection errors associated with each of the plurality of potential input planes identified in the real-world environment;
   selecting an input plane, from the plurality of potential input planes, associated with a physical surface in the real-world environment, based on determining that the input plane minimizes one or more of the projection errors;
   projecting the positions onto the input plane;
   monitoring an input state with respect to the input plane to:
      identify when the user is providing user input via the input plane, and
      differentiate between ongoing user input and finalized user input;
   recording, based on the monitoring of the input state, one or more of the projected positions as input data;
   processing the input data to interpret the user input; and
   executing an action based on the interpreted user input.

2. The method of claim 1, wherein the one or more of the projected positions comprise multiple projected positions, the recording of the one or more of the projected positions comprising:
   while the input state indicates that the user input is ongoing, recording the multiple projected positions as the user input for a single user interaction;
   detecting a transition in the input state indicating that the user input is finalized; and
   in response to detecting the transition, consolidating the multiple projected positions recorded for the single user interaction for unified interpretation.

3. The method of claim 2, wherein the monitoring of the input state further comprises:
   at a first point in time, detecting commencement of the single user interaction;
   in response to detecting the commencement of the single user interaction, updating the input state to indicate that the user input is ongoing;
   at a second point in time, detecting ending of the single user interaction; and in response to detecting the ending of the single user interaction, updating the input state to indicate that the user input is finalized.

4. The method of claim 1, wherein the monitoring of the input state comprises:
   processing at least a subset of the multiple image frames to detect engagement of the one or more parts of the hand with the input plane.

5. The method of claim 4, wherein the one or more parts of the hand comprise a fingertip of a finger of the hand, the XR device tracking the fingertip across the multiple image frames.

6. The method of claim 1, wherein the one or more parts of the hand comprise at least one finger, and the user provides the user input by using the at least one finger to write or draw on the physical surface in the real-world environment.

7. The method of claim 6, wherein the processing of the input data comprises detecting what the user has written or drawn by performing at least one of optical character recognition (OCR) or image classification.

8. The method of claim 1, wherein the tracking of the hand causes generation of three-dimensional position data, and the projecting of the positions onto the input plane comprises converting the three-dimensional position data to two-dimensional position data in an input plane space defined by the input plane.

9. The method of claim 1, wherein the hand is a first hand of the user, and the physical surface comprises a surface on a second hand of the user, the input plane being detected by fitting the input plane to the surface on the second hand.

10. The method of claim 9, further comprising:
   tracking the second hand of the user to obtain a plurality of landmark positions for the second hand, the input plane being detected by fitting the input plane to the plurality of landmark positions.

11. The method of claim 10, further comprising:
   tracking the plurality of landmark positions across the multiple image frames; and
   applying temporal smoothing to dynamically update the input plane based on the tracking of the plurality of landmark positions across the multiple image frames.

12. The method of claim 9, wherein the tracking of the first hand comprises tracking at least one fingertip of the first hand used by the user to provide the user input.

13. The method of claim 1, wherein the input plane moves relative to the XR device while the user provides the user input, the method further comprising:
   continuously tracking both a plane position of the input plane relative to the XR device and a hand position of the hand relative to the XR device.

14. The method of claim 13, further comprising, for each particular image frame of the multiple image frames:
   updating the plane position and the hand position; and
   using the updated plane position and the updated hand position to generate at least one of the one or more projected positions for a point in time associated with the particular image frame.

15. The method of claim 1, further comprising:
   prior to interpreting the user input, performing interpolation to smooth the input data.

16. The method of claim 1, further comprising:
   prior to interpreting the user input, updating the input data by performing rotation normalization.

17. The method of claim 1, wherein the monitoring the input state comprises using a machine learning model trained on at least one of:

interaction data indicating touch states and no-touch states; or interaction data indicating ongoing user input states and finalized user input states.

18. The method of claim 17, wherein the monitoring the input state further comprises using the machine learning model in combination with at least one of:

one or more geometry-based cues;

one or more distance-based heuristics; or temporal context data.

19. An extended reality (XR) device comprising:

at least one processor; and at least one memory storing instructions that, when executed by the at least one processor, configure the XR device to perform operations comprising:

generating a three-dimensional reconstruction of a real-world environment;

tracking a hand of a user across multiple image frames captured by the XR device to obtain positions of one or more parts of the hand in the real-world environment;

identifying a plurality of potential input planes in the real-world environment using the three-dimensional reconstruction;

calculating projection errors associated with each of the plurality of potential input planes identified in the real-world environment;

selecting an input plane, from the plurality of potential input planes, associated with a physical surface in the real-world environment, based on determining that the input plane minimizes one or more of the projection errors;

projecting the positions onto the input plane;

monitoring an input state with respect to the input plane to:

identify when the user is providing user input via the input plane, and differentiate between ongoing user input and finalized user input;

recording, based on the monitoring of the input state, one or more of the projected positions as input data;

processing the input data to interpret the user input; and executing an action based on the interpreted user input.

20. One or more non-transitory computer-readable storage media, the one or more non-transitory computer-readable storage media including instructions that when executed by at least one processor of an extended reality (XR) device cause the XR device to perform operations comprising:

generating a three-dimensional reconstruction of a real-world environment;

tracking a hand of a user across multiple image frames captured by the XR device to obtain positions of one or more parts of the hand in the real-world environment;

identifying a plurality of potential input planes in the real-world environment using the three-dimensional reconstruction;

calculating projection errors associated with each of the plurality of potential input planes identified in the real-world environment;

selecting an input plane, from the plurality of potential input planes, associated with a physical surface in the real-world environment, based on determining that the input plane minimizes one or more of the projection errors;

projecting the positions onto the input plane;

monitoring an input state with respect to the input plane to:

identify when the user is providing user input via the input plane, and differentiate between ongoing user input and finalized user input;

recording, based on the monitoring of the input state, one or more of the projected positions as input data;

processing the input data to interpret the user input; and executing an action based on the interpreted user input.

* * * * *